United States Patent [19]

Schaller et al.

[11] Patent Number: 5,424,927

[45] Date of Patent: Jun. 13, 1995

[54] ELECTRO-OPTIC FLASHLIGHT ELECTRO-OPTICALLY CONTROLLING THE EMITTED LIGHT

[75] Inventors: David R. Schaller, Janesville; El-Sayed Megahed, Madison; Gregory L. Mills, Middleton, all of Wis.

[73] Assignee: Rayovac Corporation, Madison, Wis.

[21] Appl. No.: 115,069

[22] Filed: Sep. 2, 1993

Related U.S. Application Data

[63] Continuation-in-part of Ser. No. 722,165, Jun. 27, 1991, abandoned.

[51] Int. Cl.⁶ .............................................. F21L 15/02
[52] U.S. Cl. .................................... 362/157; 362/208; 362/307; 362/317
[58] Field of Search ................ 362/157, 307, 200, 202, 362/317, 208, 187, 293

[56] References Cited

U.S. PATENT DOCUMENTS

| | | | |
|---|---|---|---|
| 1,712,368 | 5/1929 | Voorhees | 362/188 |
| 2,218,678 | 10/1940 | Hoffman | 362/188 |
| 2,628,305 | 2/1953 | Talbot et al. | 362/208 |
| 2,947,851 | 8/1960 | Lozeau . | |
| 3,527,894 | 9/1970 | Mesenhimer et al. | 179/16 |
| 3,900,727 | 8/1975 | Hutz | 362/302 |
| 3,943,428 | 3/1976 | Whidden | 321/15 |
| 4,037,929 | 7/1977 | Bricot et al. | 350/160 |
| 4,053,821 | 10/1977 | Mose, Jr. et al. | 363/60 |
| 4,190,330 | 2/1980 | Berreman | 350/331 |
| 4,300,818 | 11/1981 | Schacher | 351/7 |
| 4,398,238 | 8/1983 | Nelson | 362/187 |
| 4,441,791 | 4/1984 | Hornbeck | 350/360 |
| 4,461,989 | 7/1984 | Dutson et al. | 323/222 |
| 4,466,703 | 8/1984 | Nishimoto | 350/379 |
| 4,514,648 | 4/1985 | Dutson et al. | 307/350 |
| 4,564,267 | 1/1986 | Nishimoto | 359/483 |
| 4,572,616 | 2/1986 | Kowel et al. | 350/335 |
| 4,592,628 | 6/1986 | Altman et al. | 350/486 |
| 4,601,545 | 7/1986 | Kern | 350/347 |
| 4,605,994 | 8/1986 | Krieg | 362/187 |
| 4,688,900 | 8/1987 | Doane et al. | 350/347 |
| 4,756,605 | 7/1988 | Okada et al. | 350/347 |
| 4,765,719 | 8/1988 | Fergason | 350/350 |
| 4,774,624 | 9/1988 | Qualich | 361/159 |
| 4,806,776 | 2/1989 | Kley | 250/560 |
| 4,807,097 | 2/1989 | Gammache | 362/202 |
| 4,984,140 | 1/1991 | Ellion | 362/187 |
| 5,031,080 | 7/1991 | Aikens et al. | 362/187 |
| 5,143,442 | 9/1992 | Ishikawa et al. | 362/208 |

FOREIGN PATENT DOCUMENTS

| | | | |
|---|---|---|---|
| 0326420A2 | 8/1989 | European Pat. Off. | F21V 7/06 |
| 2037416 | 7/1980 | United Kingdom | F21L 7/15 |
| 2074303 | 10/1981 | United Kingdom | F21V 7/09 |

OTHER PUBLICATIONS

Cuff, Daniel F., "Flashlights with a Twist", Jun. 13, 1993, The New York Times.
Brinkley et al., "Liquid Crystal Adaptive Lens: Beam Translation and Field Meshing," 1988, pp. 4578–4586, Applied Optics, vol. 27, No. 21.
Land, E. M., "Some Aspects of the Development of Sheet Polarizers", 1951, pp. 957–963, Journal of the Optical Society of America.
Sato et al., "Variable Focus Liquid–Crystal Fresnel Lens," 1985, pp. L626–L628, Japanese Journal of Applied Physics.
Tannas, L. E., "Flat Panel Displays and CRTs", 1985, pp. 415–454.

*Primary Examiner*—Ira S. Lazarus
*Assistant Examiner*—L. Heyman
*Attorney, Agent, or Firm*—Thomas F. Woods; Stuart H. Mayer; Phillip G. Hampton, II

[57] ABSTRACT

A flashlight is disclosed comprising a light source and a reflector for collimating the light emitted by the light source to form a collimated light beam. An electro-optically controlled region is disposed forwardly of the light source, the collimated light beam being incident upon and passing through the electro-optic region. The electro-optic region may be operated in at least two states. In a first embodiment, and in a first state, the electro-optic region does not substantially affect the collimation of the light beam incident thereon, and the flashlight produces a spot beam. Also in the first embodiment, and in a second state, the electro-optic region scatters forwardly the collimated beam incident thereon, and thus the flashlight produces a well-diffused flood beam.

21 Claims, 22 Drawing Sheets

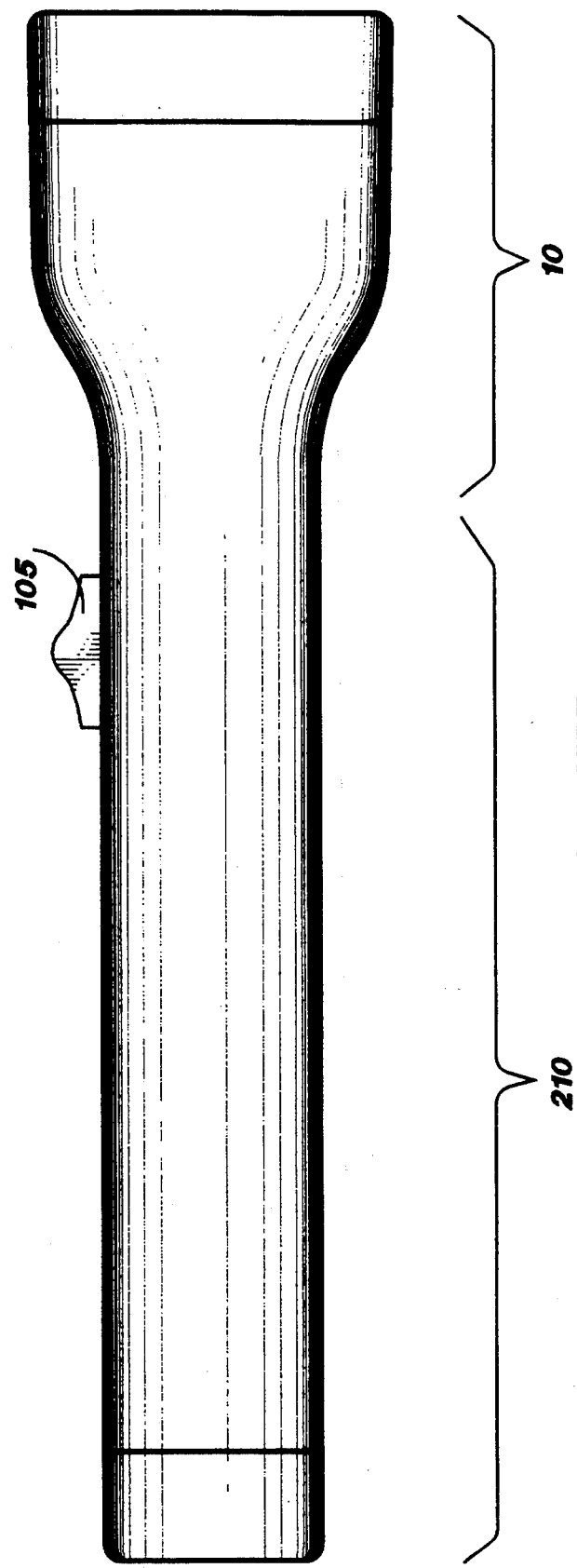

ELECTRO-OPTIC FLASHLIGHT ELECTRO-OPTICALLY CONTROLLING THE EMITTED LIGHT

This application is a continuation-in-part of U.S. patent application No. 07/722,165, filed Jun. 27, 1991, now abandoned.

FIELD OF THE INVENTION

The present invention relates to a lighting apparatus that electro-optically controls the characteristics of the emitted light. More particularly, the present invention relates to a flashlight in which characteristics of the emitted light, such as its direction, divergence and color, are controlled and switchable electro-optically.

BACKGROUND OF THE INVENTION

A lighting apparatus such as a flashlight or electric lantern typically serves a number of purposes. For example, it may be used to illuminate a nearby extended area or a distant object. A flashlight adapted for illuminating distant objects preferably has a narrowly focused spot beam. A flashlight designed for viewing a nearby extended area should have a broad flood beam.

Known flashlights typically generate only a spot beam for illuminating distant objects. No provision is usually made for generating a separate flood beam. Those flashlights that do provide both a spot beam and a flood beam often do so in inconveniently controlled, or complex ways. For example, mechanically separate attachments have been provided for diffusing the light from the spot beam. Such attachments, however, are bulky and require time to couple them to the flashlight. Other devices use separate lighting sources for each beam, but these tend to be too large to offer the versatility and ease of use of a hand-held flashlight. Still other devices use mechanical linkages to move the light source out of the focal point of the collimator. Such devices, however, provide uneven flood beams with gaps in the center of the beam.

It is also desirable for a flashlight to provide light in different colors. For example, in order to preserve night vision, an individual working in a darkened environment usually prefers to illuminate a nearby object with red light. However, to examine an object in more detail and at the risk of losing night vision, it may be preferable to illuminate the object with white light. Thus, a single lighting apparatus providing both red light and white light would be advantageous. However, known lighting devices that provide more than one color of light typically require more than one light source or filters that must be changed, or use clumsy mechanical actuations.

The present invention overcomes these well documented deficiencies of prior art devices by providing lighting devices in which characteristics of the emitted light such as its direction, divergence and color can be switchably controlled in an extremely simple, reliable, compact, convenient and efficient manner.

SUMMARY OF THE INVENTION

In one embodiment of the present invention, a lighting apparatus includes a light source, a reflector means for collimating the emitted light and an electro-optically controlled region. The electro-optic region, which can be operated in or between different states, is disposed in front of the light source so that the collimated light is incident upon the plane of the electro-optic region. In the first state, the electro-optic region appears transparent to the collimated light beam and a spot beam is produced. In the second state, the electro-optic region forward scatters the collimated light, producing a well-diffused flood beam is produced. A voltage source, controlled by a switch or a continuously variable control, is coupled to the electro-optic region and determines the state of the region. In embodiments forming a bistable electro-optic control, only momentary voltages are required.

In an alternative embodiment of the present invention, collimated light is incident upon an electro-optic cell. The electro-optic cell includes two prisms transparent to light with their diagonal faces parallel to one another. An electro-optic material is provided between, and in physical contact with, the two diagonal faces. Such an electro-optic cell has two defined states. In the first state, the electro-optic cell appears transparent to the collimated light, resulting in a spot beam. In the second state, the collimated light undergoes internal reflection at the interface formed by one of the prisms and the electro-optic material, producing a beam of light that is deflected from the direction of the collimated beam. The deflected beam may also be dispersed to form a flood beam. Similarly, the spot beam and/or the deflected beam may have their colors selected or adjusted, as described below.

According to another aspect of the invention, an electro-optic reflector is used instead of an electro-optic region. In this embodiment, the reflector that collimates the light beam emitted by the light source includes a conventional reflector that is overlaid with an electro-optic region. In a first state the electro-optic reflector specularly reflects the light, thus producing a spot beam. In a second state the electro-optic reflector diffusely reflects the light, forming a flood beam. This embodiment advantageously eliminates the need for a self-supporting electro-optic region that might in some cases be more prone to damage, particularly if the electro-optic region is exposed.

According to yet another aspect of the invention, the lighting apparatus includes an electro-optic filtering region which can be operated in two or more different states. In a first state, the filtering region is transparent to the collimated light beam, while in a second state, the filtering region only transmits a portion of the light frequencies of which the collimated beam is comprised. Since the portion of the light frequencies transmitted corresponds to a particular color or colors of light, the lighting apparatus provides a colored light beam. The filtering region may advantageously include a series of electro-optic filtering layers so that the lighting apparatus can selectively emit a light beam having one or more different colors or combinations thereof. The light beam may also be continuously varied or switched between colors, spectral regions, or combinations thereof.

The embodiments of the invention described above are described for illustrative purposes only. The invention is applicable to lighting devices of all types, including the smallest of lighting devices. Furthermore, the invention may include any combination of the features described above and is not limited to those particular examples.

BRIEF DESCRIPTION OF THE DRAWINGS

FIG. 17D shows a side view of the flashlight of FIG. 17A.

DETAILED DESCRIPTION

Figure 1:
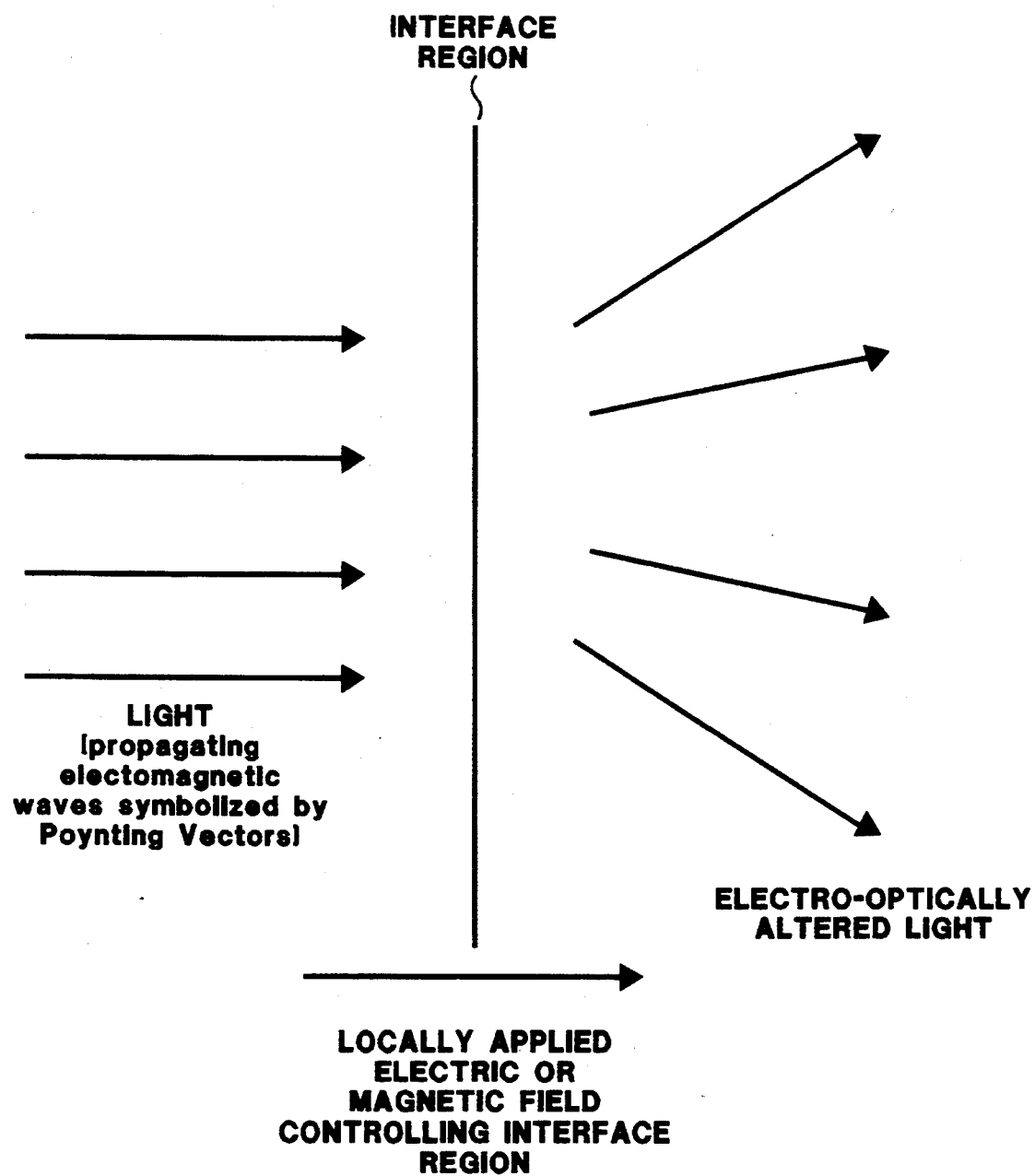
FIG. 1 illustrates conceptually some electro-optic principles upon which the invention is based.

FIG. 1 illustrates some conceptual principles on which the invention is based. A light beam is incident upon an interface region. The interface region, controlled by an electric and/or a magnetic field, can electro-optically interact with the light beam, which can alter basic characteristics of the light beam. In FIG. 1, the divergence of the light is altered as it passes through the interface region. However, other characteristics of the light beam may also be altered by electro-optic interaction.

Maxwell's relation, $$n = \sqrt{k}$$

which relates the index of refraction to dielectric constant k (a transparent dielectric, for the purposes here) may be seen as one basis for electro-optic effects, since for many dielectric materials, k is a function of the applied electric field. In Maxwell's relation, the functional relationship between the variables (i.e., that n varies with k), rather than the precise numerical values for specific cases, which in practice also depend on secondary effects such as dispersion, is important. Electro-optic interactions are well-known and will not be discussed in any further detail.

Figure 2A:
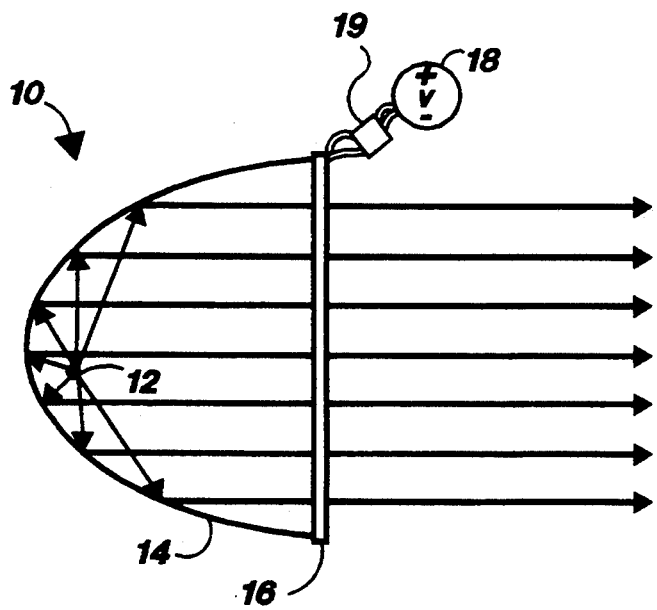
FIGS. 2A and 2B show a cross-sectional view of a lamp housing of the lighting apparatus constructed according to a first embodiment of the invention when the electro-optic region is in a transparent state (FIG. 2A) and when it is in a scattering state (FIG. 2B)
Figure 2B:
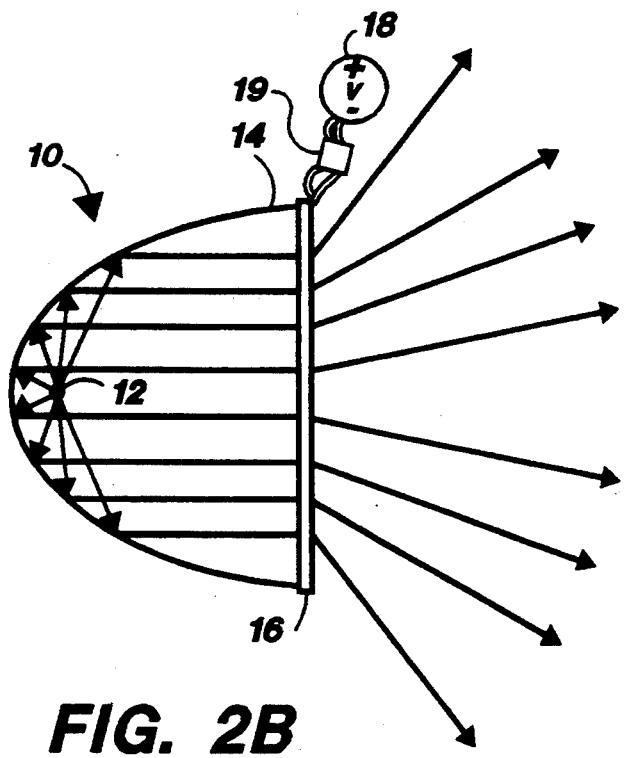

FIG. 2 shows a first embodiment of the lighting apparatus constructed according to the principles of the invention. In this embodiment, as well as the ones that follow, the lighting apparatus is formed as a flashlight for the purposes of illustration. However, the lighting apparatus need not be limited to flashlights, e.g., the lighting apparatus may be a lantern. In FIG. 2, only the lamp housing 10 is shown; the remainder of the flashlight may have any desired size or configuration. The lamp housing 10 includes a light source 12, such as a nominal 3 volt lamp, a light emitting diode, or any other source of illumination. The light source 12 may include a retro-reflecting mirror to form a high-quality spot beam.

In FIG. 2, a parabolic reflector 14 collimates the light from light source 12. However, other types of collimators, such as lenses, are within the scope of this invention. In FIG. 2, an electro-optic region 16 disposed in front of the light source 12 acts as a controllable window so that the collimated light from the reflector 14 is incident upon the plane of the electro-optic region 16 in a substantially perpendicular direction. However, in the present invention, the electro-optic region 16 may be disposed at any position such that the light emitted by the light source 12 interacts with the region 16 before it is transmitted from the flashlight. In particular, the electro-optic region 16 may be disposed at any position between the light source 12 and the reflector 14. A voltage source 18 is coupled to the region 16 through switch 19. The voltage source 18, which may be contained within the flashlight housing, is only illustrated schematically in FIG. 2 and will be discussed in more detail below.

The electro-optic region 16 can be operated in or between two distinct states which are controlled by the voltage source 18 via switch 19 or a continuously variable (e.g., potentiomer-type) control. In the first state, shown in FIG. 2A, switch 19 is off and the region 16 is transparent to the collimated light beam. The beam transmitted by the light source 12 is collimated by the reflector 14 and then transmitted substantially unaffected through the electro-optic region 16, forming a spot beam as in a common flashlight. In the second state, shown in FIG. 2B, switch 19 connects voltage source 18 to electro-optic region 16, so that the collimated light is forward scattered as it passes through electro-optic region 16. In other words, the light is no longer collimated but is scattered to form a broad flood light that can illuminate an extended area.

The electro-optic region 16 may be formed in any known manner so that it appears transparent to light in one state and affects the light in another state. In many embodiments, the electro-optic region, when in its other state, scatters the light. Liquid crystals, which are categorized into three general classes according to the orderliness of structure: noematic, cholesteric, and smectic, are particularly preferred for use as the electro-optic region 16. The anisotropic and birefringent characteristics of liquid crystals are useful in controlling the scatter of the incident light. The orientation and activity of the liquid crystal molecules are controlled by a field that is externally applied to the liquid crystal. This external field may be established by a voltage that is supplied across transparent electrodes in the electro-optic region.

A noematic liquid crystal may be chosen and doped so that in its quiescent state, i.e., when no voltage is supplied across the electrodes, the liquid crystal appears transparent to light. However, in its non-quiescent state, i.e., when voltage is supplied across the electrodes, the liquid crystal, by a process known as dynamic scattering, scatters light. Being a species of Mie scattering, dynamic scattering, which is due to localized electrically induced changes in the index of refraction (Heilmeir et al., Applied Physics Letters, Vol. 13, No. 1, p. 47), forward scatters light and generally avoids back scattering of light. As the liquid crystals change their state, dynamic scattering provides readily observed unique lighting effects. Upon activation of the liquid crystal, the scattering effect propagates through the large-scale area of the medium in such a way that the light undergoes a pseudo motorized/automatic zoomar effect, or a quasi-auto-focusing effect. Moreover, when the medium is fully activated, the unusual and visually striking effect present in the steady-state dynamic scattering itself is observed. This effect appears as myriad tiny twisting motions in the now-translucent liquid crystal material itself, due to the turbulence characteristic of the dynamic scattering mode.

A type CID plate manufactured by UCE Incorporated is an example of a noematic, dynamic scattering plate. The plate has a non-quiescent state that operates at a voltage greater than 6 volts (ac or dc) at a frequency of between approximately 0–1000 Hz. An ac voltage of between 10–30 volts peak has been found to be particularly advantageous. The frequency of the voltage merely has to be high enough to avoid any visible flicker of the transmitted light. A frequency equal to or greater than approximately 60 Hz has been found to be sufficient. The dynamic scattering plate advantageously tolerates substantial connection resistance, as in the use of elastomeric connections to the plate.

Another example of an electro-optic material that may be used for the electro-optic region 16 is the well-known polymer dispersed liquid crystal (PDLC) sheet, which in one form is made from micron-size droplets of a low-molecular weight noematic liquid crystal dispersed in a polymer binder. The noematic droplets strongly scatter light in the quiescent state. When a voltage is applied, the resulting electric field causes the polymer dispersed liquid crystal material becomes transparent. The electric field aligns the droplets so that their refractive index nearly matches that of the polymer, significantly reducing the scattering power of the droplets and providing an approximately clear (i.e., transparent) state. An example of a polymer dispersed liquid crystal that is suitable for the lighting apparatus of the present invention is disclosed in U.S. Pat. No. 4,688,900.

Electrically controlled scattering polarizers having two plates, may be used to form the electro-optic region 16. Collimated light initially passes through a first plate which may be formed from a noematic or twisted noematic plate, which controls the polarization of the light. The light then passes through a second plate, i.e., a scattering polarizer, which scatters or does not scatter the polarized light according to its state of polarization. The plates of the scattering polarizers, which are disclosed by Edwin H. Land, *Journal of the Optical Society of America*, 41, 957 (1951), may be operated at a voltage lower than that needed to cause dynamic scattering, function as polarizers. Thus, embodiments of the invention using scattering polarizes operate at lower voltages than the embodiments previously described that utilize noematic plates as light scatterers rather than as polarizers.

Other examples of electro-optic (which, as used herein, includes any interaction that produces optically observable results from electrical activation) materials and/or devices that may be used in the invention are electroactive solids in which electric fields can produce scattering by electrostriction, as well as materials in which temperature is used as the switching parameter rather than, or in addition to, applied electromagnetic fields, and cholesteric materials and cholesteric-noematic phase transitions for scattering light, all of which are disclosed in *Flat-Panel Displays and CRTs*, Lawrence E. Tannas, Jr., ed., p. 13, 16, 18, and pp.415–457, (Van Nostrand Reinhold, New York 1985); tunable direfringence LCDs as disclosed in *Nonemissive Electrooptic Displays*, A. R. Kmetz and F. K. von Willisen, eds., (Plenum Press, New York, 1976); and many of the materials disclosed in *Liquid Crystal Displays*, Birendra Bahadur, Mol. Cryst. and Liq. Cryst., Vol. 109, No. 1, (1984), pp. 3–98. Additionally, the electro-optic region 16 may be formed directly from electric and/or magnetic fields that interact either with the air and/or the light beam, as shown conceptually in FIG. 1, or with the glass or plastic window typically used in lighting devices (e.g., via the Faraday effect.) In the former cases, the usual transparent electrode areas (e.g., indium-tin-oxide on glass or plastic) normally required on the surface of electro-optic materials may be eliminated. The fields can be generated in any known manner.

The electro-optic region 16 can be switched between its quiescent and non-quiescent states as described below in order to provide a spot beam or a flood beam. Assuming that in its quiescent state, the electro-optic material appears transparent to light, as voltage is supplied to the electro-optic region 16, the light begins to scatter. As the voltage increases, the width of the diverging beam increases. Conversely, if a material is chosen such that the non-quiescent state appears transparent to light, as the applied voltage increases, the degree of scattering and the divergence of the beam decreases. The voltage supplied to electro-optic region 16 can be controlled in one of two ways, each giving the lighting apparatus a different lighting effect. In a first configuration, the voltage to the region 16 is controlled by switch, such as a double pole, multi-position switch. The switch can be adjusted to discrete settings so that the applied voltage takes on one of a number of predetermined values. As the switch setting is adjusted, the diffusion of the diverging beam varies in a corresponding manner so that the flashlight provides a light beam that can be set to a number of positions intermediate to the spot beam and the flood beam. Such a first configuration will be referred to as "switch selectable". In a second configuration, the voltage to the region 16 is controlled by a continuously variable control (e.g. potentiometer) so that the voltage applied to region 16 can take on any value within a predetermined range. As the voltage is varied, this second configuration provides a pseudo-focus effect whereby the light beam appears to vary smoothly, rather than incrementally, between a spot beam and a flood beam. If the voltage is varied in this second manner, a pseudo-zoomar effect is observed. This second configuration will be referred to as "continuously adjustable".

Figure 3A:
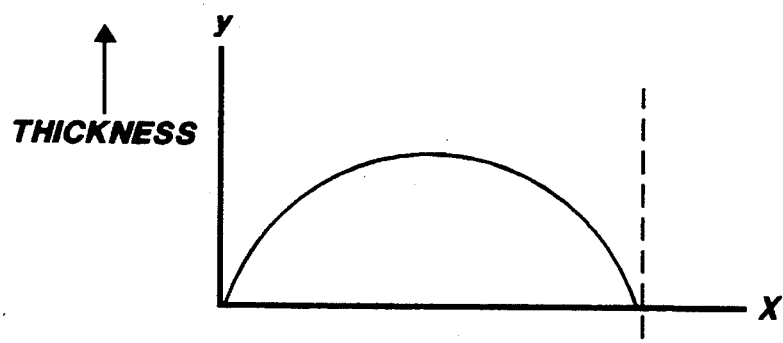
FIG. 3A graphically illustrates the thickness of a conventional lens as a function of lateral position across the lens, and FIG. 3B graphically illustrates the refractive index profile of a conventional lens as a function of lateral position across the lens.
Figure 3B:
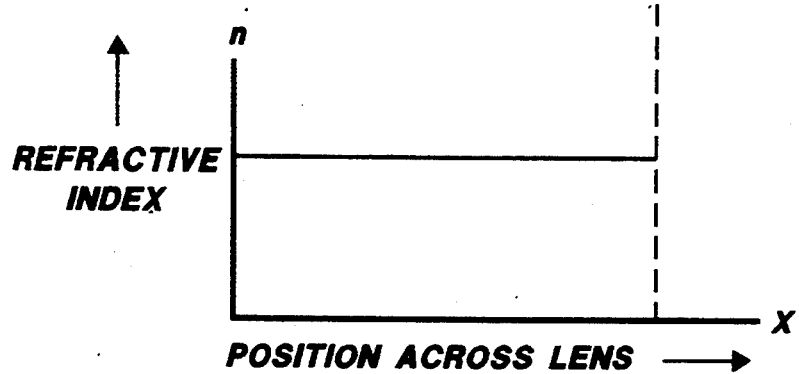
Figure 4A:
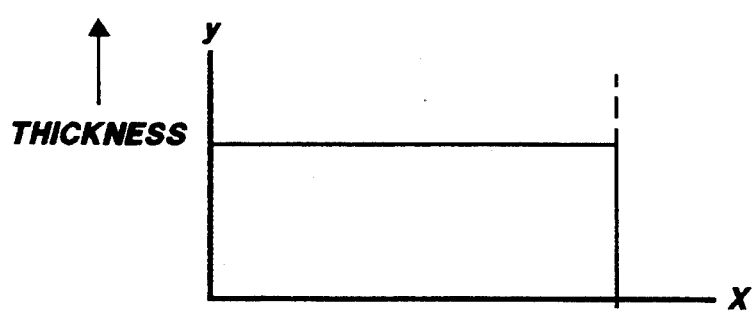
FIG. 4A graphically illustrates the width of an electrically operated lens as a function of lateral position across the lens and FIG. 4B graphically illustrates one particular refractive index profile of an electrically operated lens as a function of lateral position across the lens.
Figure 4B:
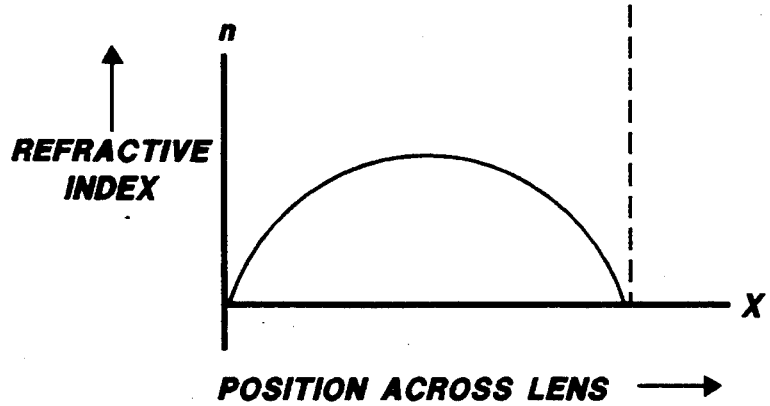

In an alternative embodiment of the invention, a planar electro-optic region 16 is provided that has an index of refraction profile along its surface that is non-constant in the radial direction. The region 16 thus acts like a lens, since a lens may be generally defined as a refractive medium in which the optical path length is varied across its surface in the radial direction. As seen in the graphs of FIG. 3, a conventional lens is made from an optical material having a curved surface (e.g., spherical, paraboloidal etc.) and a constant index of refraction. Such refractive effects can be achieved by a planar material that has a non-constant index of refraction profile along its surface, as illustrated in the graphs of FIG. 4. This profile may have any desired shape, such as spherical, paraboloidal, or hyperboloidal. Similar to a conventional lens, this planar material has an optical path length that varies across its surface in the radial direction, thus yielding the refractive properties of a lens. However, unlike a conventional lens, which has a fixed focal length, a material may have a non-constant refractive index profile that can be varied, thus yielding a lens that has a variable focal length. The advantage of using a lens with a variable focal length for electro-optic region 16 is that the collimated light beam transmitted therethrough can be made to converge or diverge in a precisely controlled, variable manner to produce a spot beam or a flood beam, respectively. Alternatively, other types of beam patterns or images may be produced, including electrically controlled beam movement or translation.

A number of electro-optic materials are known in which the refractive index profile can be varied and which may serve as the electro-optic region 16. A lens formed from such materials will be referred to as an electrically operated lens. For example, U.S. Pat. No. 4,466,703, discloses a lithium tantalate plate covered by transparent electrodes shaped as concentric rings. As different voltages are applied to each electrode ring (the lowest voltage being in the center ring and the highest voltage being in the outermost ring, for example), the refractive index profile along the radius of the plate is varied so that the plate acts like a lens. The focal length of the lens can be adjusted by varying the voltage applied to the ring electrodes. Other electro-optic materials that may be used include the liquid crystals, disclosed by Patrick F. Brinkley, et al., *Applied Optics*, 27, 4578 (1988) and nematic liquid crystals having variable focal lengths disclosed by Susumu Sato, et al., *Japanese Journal of Applied Physics*, 24, 626 (1985). The focal length of a liquid crystal material can be continuously varied between the focal length of the ordinary ray and the focal length of the extraordinary ray. For example, in the lens disclosed by Sato, a voltage of about 1–8 volts (rms) is applied to vary the focal length of the lens between approximately 20 and 75 cms.

A flashlight incorporating an electrically operated lens for region 16 may provide a light that can be adjusted between a spot beam and a flood beam in a switch selectable or a continuously adjustable manner. In the switch selectable configuration, as the switch is adjusted from one predetermined value to another, the focal length of the region 16 also changes from one predetermined value to another. This change in focal length in turn corresponds to a change in the width of the diverging beam. Thus, the switch selectable flashlight can provide the light varies discreetly between a spot beam and a flood beam. In the continuously adjustable configuration, as the voltage is continuously varied, the focal length of region 16 is also continuously varied and thus the flashlight provides an adjustable focus, whereby the light can be made to vary between a spot beam and a flood beam.

Figure 5:
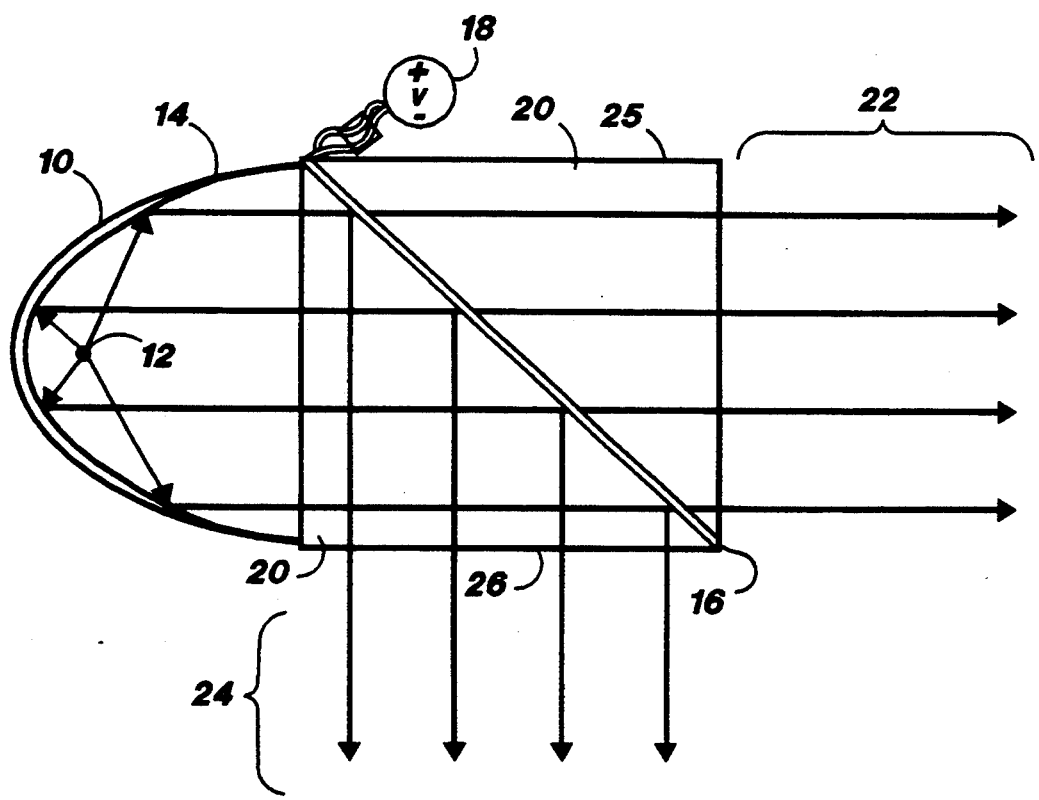
FIG. 5 shows a cross-sectional view of a lamp housing of the lighting apparatus constructed according to an alternative embodiment of the invention.

FIG. 5 illustrates another embodiment of the invention which utilizes an electro-optic cell 25. In this embodiment, the collimated light 22 is emitted from the flashlight in the forward direction. Alternatively, the collimated light can be emitted from the flashlight so that it is deflected from the forward direction, e.g., in FIG. 5, light 24 is deflected by 90°. Furthermore, the deflected light 24 may be scattered to form a broad flood beam, or, as discussed below, the color of the deflected beam 24 may be selectively controlled. As before, a continuously variable configuration may be used.

The example of an electro-optic cell 25 shown in FIG. 5 includes two prisms 20 that appear transparent to light and have an index of refraction $n_p$. The prisms may be any optically transparent materials, e.g., molded plastic. The prisms 20 are arranged so that their diagonal faces are parallel to one another. An electro-optic region 16 is provided between, and in physical contact with, the two diagonal faces of the prisms 20. As shown in FIG. 5, the electro-optic cell 25 is coupled to the lamp housing 10 of the flashlight. The overall cross-section of the cell need not be square as in typical paired prisms, but may have any desired shape. For example, the cross-section may be circular to conform to the circular aperture of a reflector or lens. The electro-optic region 16 has an index of refraction substantially equal to $n_p$ in its quiescent state and an index of refraction $n_f$ in its non-quiescent state.

The values of $n_p$ and $n_f$ are chosen so that the collimated light will be incident upon region 16 at its critical angle and thus the light will undergo total internal reflection when desired. Consequently, the particular values of the refractive indices $n_p$ and $n_f$ chosen will depend on the angle of incidence that the collimated beam makes with the region, e.g., 45° in FIG. 5. Of course, for total internal reflection to occur, $n_p$ must be greater than $n_f$.

When region 16 is in its quiescent state, the electro-optic prisms 20 and the region have substantially the same index of refraction so that the collimated light is transmitted through the electro-optic cell 25 to form the spot beam 22. When the electro-optic region 16 is in its non-quiescent state, the collimated beam undergoes total internal refection and is deflected to form the spot beam 24. As before, the configuration of electro-optic region 16 may be reversed so that in its quiescent state region 16 has an index of refraction equal to $n_f$.

After the collimated light is reflected to form the deflected spot beam 24, it may be dispersed to form a flood beam. This dispersion may be produced in any manner known in the art. For example, a dispersing medium may be placed over the face 26 of the prisms 20 through which the light 24 passes. Alternatively, face 26 may be curved so that it acts like a hemispherical, hemicylindrical, or another geometrically shaped lens, that any be facetted, or matte-surfaced, thus dispersing the deflected beam 24. Hence, electro-optic cell 25 may not only deflect the light beam but may produce a flood beam as well. Furthermore, the prisms 20 may be shaped so that the collimated beam is incident upon electro-optic region 16 at an angle other than 45°. In such a case, the value of $n_f$ must be adjusted accordingly since the critical angle the beam makes with the region 16 has been altered.

The electro-optic cell 25 may incorporate a region 16 that is formed from any known electro-optic material such as the liquid crystal materials discussed above. If an electrically operated lens is used, the refractive index of region 16 will vary across its surface. Consequently, the refractive index profile may be chosen so that part of the collimated beam is transmitted directly through region 16 and part of the beam undergoes total internal reflection so that it is deflected from the forward direction and the flashlight provides two light beams directed at right angles to one another. Furthermore, if the deflected beam is dispersed to form a flood beam, the flashlight provides simultaneous spot and flood beams. One particular example of an electro-optic cell configuration that may be used in the present invention is the solid-state type OSD optical switch sold by UCE Incorporated.

Figure 6:
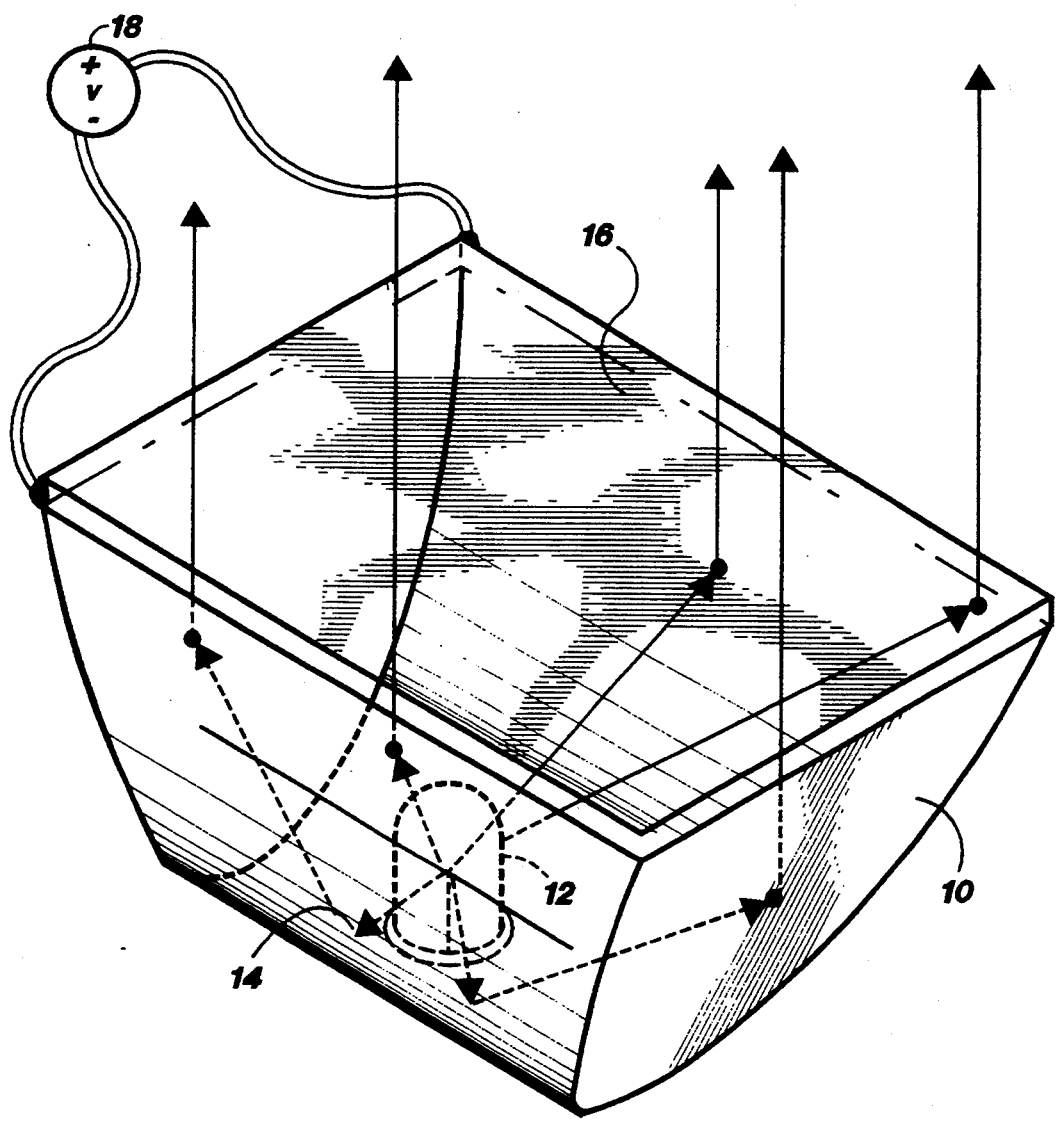
FIG. 6 shows a perspective view of a lamp housing of the lighting apparatus constructed according to yet another alternative embodiment of the invention.

An additional embodiment of the invention that utilizes an electro-optic reflector rather than an electro-optic region is shown in FIG. 6. In this embodiment an electro-optic structure overlays the reflector 14. The electro-optic structure may have any suitable electro-optic configuration. An electro-optic reflector utilizing a dynamic scattering material is disclosed in a review article by Astle in *Optical Spectra*, Volume 7, No. 7, July 1973, pp. 35-37, and is well-known in early dynamic-scattering-display digital watches. When the electro-optic material appears transparent to the emitted light, the light passes through the material and is specularly reflected by the reflector 14 so that a collimated "spot" beam (a narrow and wide beam from the trough reflector shown in FIG. 6) is emitted from the lamp housing 10. When the electro-optic material does not appear transparent to the emitted light, the light is diffusely reflected so that a broad flood beam is emitted from the lamp housing 10. While the electro-optic reflector 14 of FIG. 6 is trough-shaped, it may be of any desired shape, e.g., paraboloidal or hyperboloidal.

A further embodiment of the invention utilizes an electro-optic region 16 that acts as a filter, permitting only a selected portion of the visible spectrum to be transmitted therethrough. One example of such an electro-optic material incorporates a colored dye so that in the quiescent state the filtering region 16 is transparent, allowing the entire collimated beam emitted from the lamp housing 10 to be transmitted through the region 16. Examples of these electro-optic materials are disclosed by Heilmeier, *Scientific American*, Volume 222, No. 4, April 1970, pp. 104-105. In its non-quiescent state, electro-optic region 16 acts as a filter so that only a selected range of the frequencies making up the beam are transmitted therethrough. As usual, the quiescent and non-quiescent states of the filtering region 16 can be reversed. Furthermore, combinations of materials may allow light of various colors (including white) to be alternately transmitted through the region 16 or continuously adjusted by varying the applied voltages with a potentiometer. An example of a filtering material that may be used for the filtering region 16 are color plates supplied by UCE Incorporated, such as the CIN-D plate that acts as a blue filter and the CIN-O plate that acts as a green filter.

For example, a flashlight incorporating an electro-optic region 16 acting as a red filter and a conventional white light source can be very conveniently electrically switched between white and red. Such a flashlight may be advantageously used by pilots, automobile drivers, and other individuals who need a red light source to preserve their night vision and a white light source for critical observations of maps, etc.

Furthermore, the electro-optic region 16 may be formed from a series of electro-optic filtering layers which each transmits a different color of the visible spectrum and which can each be activated independently from the other layers. If all of the individual filtering layers are activated so that they are simultaneously transparent, the flashlight will emit white light. If the state of one of the filtering layers is changed by a switch so that it acts as a filter, the flashlight will emit light of the color corresponding to that filter. For example, if the region 16 includes a red and a green filter, the flashlight can emit white light, green light or red light simply by switching the states of the electro-optic layers. Thus, this flashlight allows the user to selectively change the color of the light to be emitted. Additional colors of light may be made available by activating two or more filtering layers simultaneously.

For example, in a particular configuration, using two different filtering layers, one of which filters in its electro-optic quiescent state and one of which filters in the non-quiescent state. When the switch controlling the voltage source is in a first position this flashlight emits light of one particular color. When the switch is moved to its second position the flashlight emits light of a different color. Thus, this flashlight provides a light beam that can be switched between two different colors. Of course, the examples are merely illustrative and the lighting apparatus may use any combination of filters and light sources to achieve the desired characteristics of the light beam (e.g., continuously variable voltage adjustments). While the lighting apparatus may optionally utilize tunable birefringence for voltage-tunable color, the present invention may incorporate any combination of features illustrated in the above-described embodiments.

Typically, the present invention applies approximately 10-20 volts d.c. or rms nominally across the electro-optic window. However, depending on the type of electro-optic window the required voltage may be higher.

A myriad of voltage sources and associated circuitry may be used in the present invention, some of which are particularly advantageous when the lighting apparatus is configured as a flashlight.

For example, the voltage source may be two 9 volt batteries. To use batteries with low voltages (e.g. 3 volt), a circuit is required to boost the voltage from the low voltage to the required higher nominal voltage. For operational longevity reasons, the voltage applied to some of the electro-optic windows should contain no d.c. values or should only contain a minimum practical amount of d.c. component. In these cases, therefore, the circuitry may also create an a.c. waveform from the boosted d.c. voltage. Sinusoidal or other a.c. waveforms may be used, and in some cases preferred; however, it is usually sufficient and more convenient to generate square waves for this application.

Figure 7:
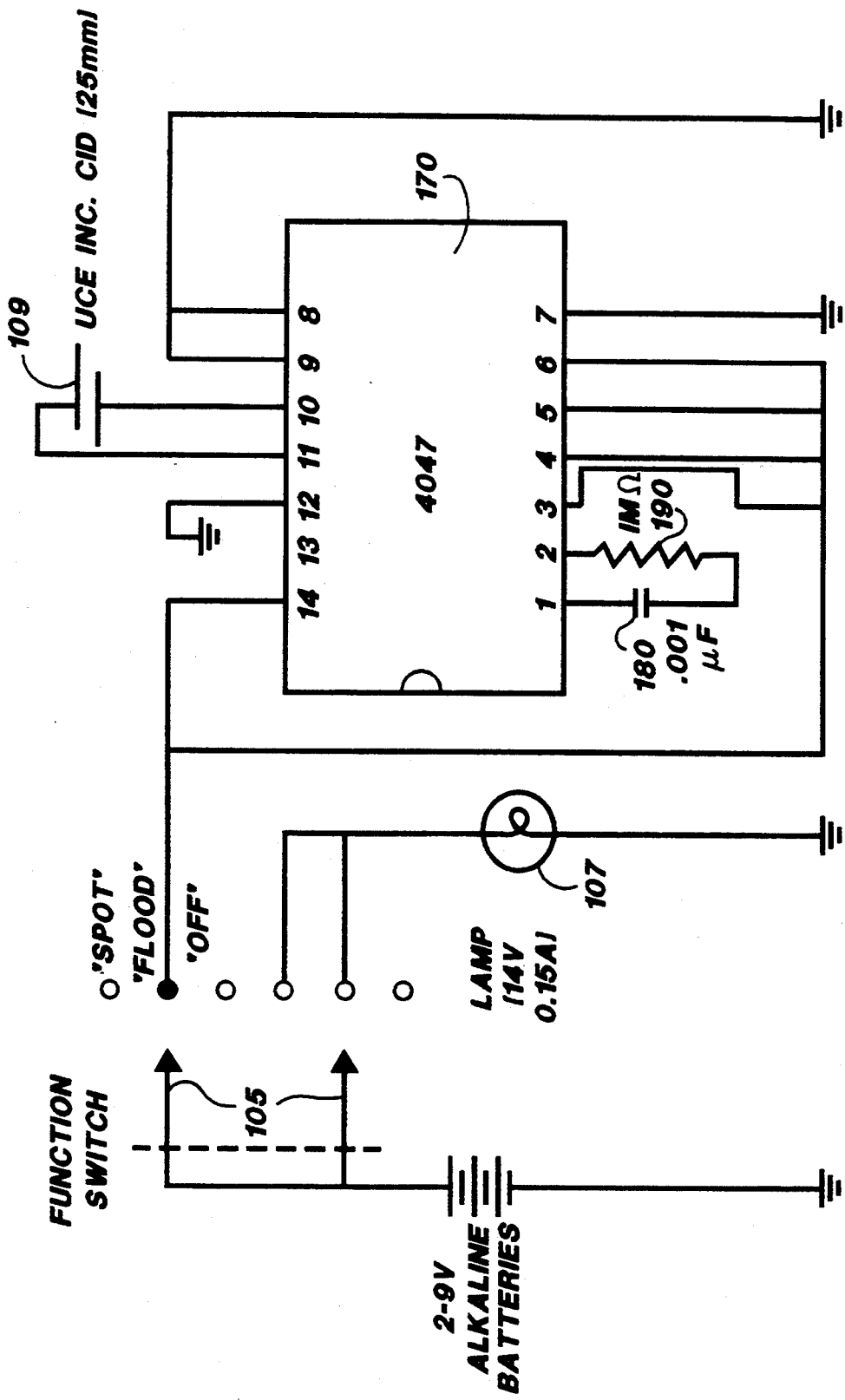
FIG. 7 illustrates one embodiment of a square wave generator for actuating the electro-optic element that is operated from batteries.

FIG. 7 illustrates one embodiment of the circuit, for converting the input voltage to a symmetrical square wave. This circuit uses an integrated circuit 170 (e.g., a 4047), a capacitor 180 and a resistor 190. The d.c. supply voltage is input to the integrated circuit 170 at pin 14. The integrated circuit 170 contains a square wave generator and a frequency divider to create the a.c. voltage required for the electro-optic window 109. The new symbol established for 109 is intended to describe the roughly capacitive electrical nature of the item, the photon interaction, and the often cantilevered physical format which allows for electrical contacts. The timing of the square wave generator is controlled by the capacitor 180 and the resistor 190, coupled to pins 1, 2 and 3 of the integrated circuit 170. The integrated circuit halves the frequency of the voltage at pin 14 and outputs a square wave that appears at complementary outputs at pins 10 and 11. A three position switch 105 controls the application of the voltage across the electro-optic window 109. As shown in FIG. 7, the top setting removes the voltage from across the electro-optic window 109 (thereby creating the "spot" effect for this type of electro-optic window 109) and turns on bulb 107. The middle setting applies the voltage across the electro-optic window 109 via the circuitry to create the "flood" effect. The bottom setting removes the voltage from the electro-optic window 109 and turns off bulb 107.

Figure 8:
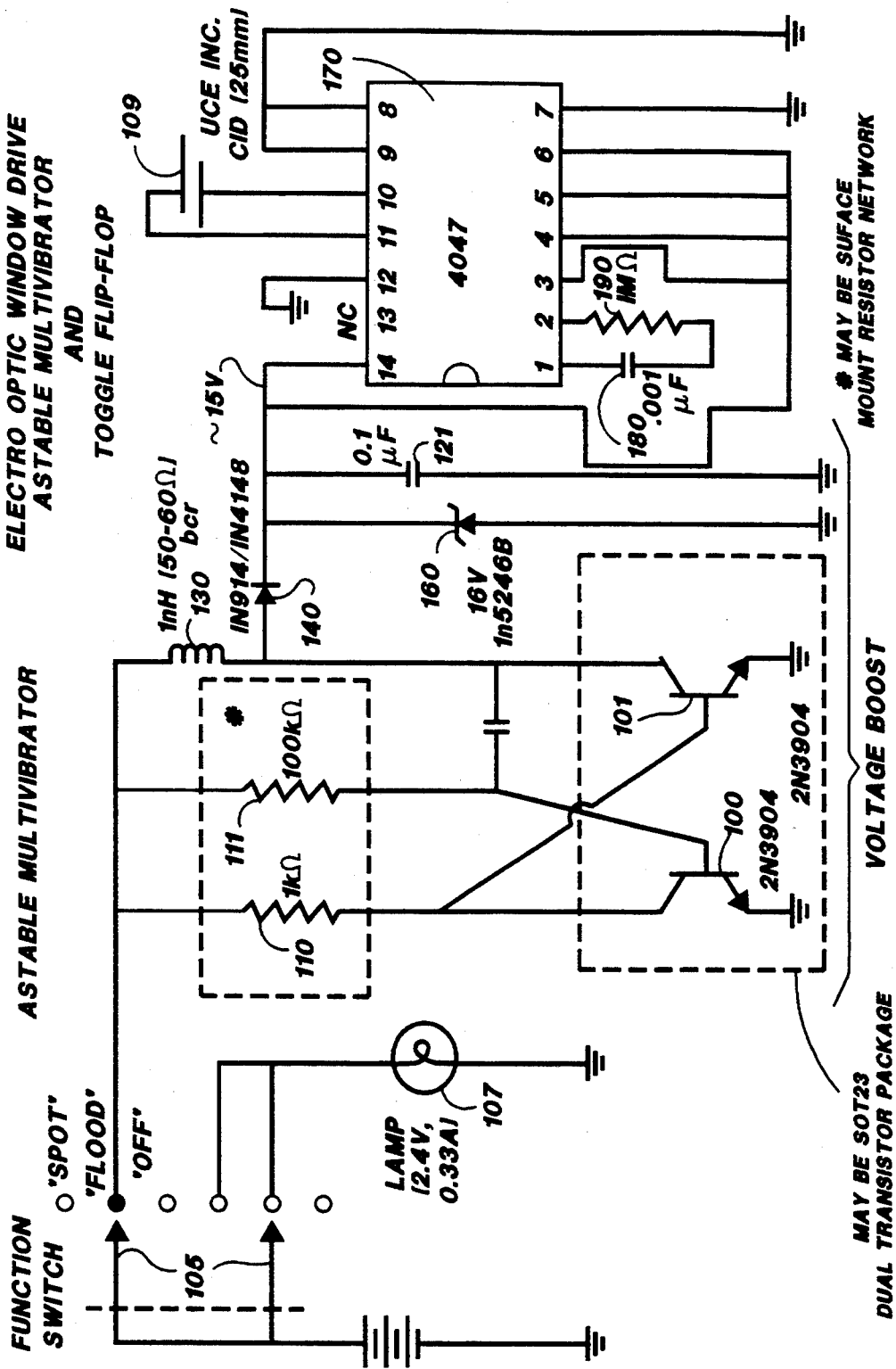
FIG. 8 shows FIG. 7 with a voltage boost circuit.

FIG. 8 illustrates the addition of voltage boost circuitry to FIG. 7. In FIG. 8 there are two npn bipolar junction transistors 100 and 101 (which may be physically a single SOT-23 dual transistor package), two resistors 110 and 111, a capacitor 120 and an inductor 130 to form an astable multivibrator. The base of the transistor 100 is connected to the collector of the transistor 101 via the capacitor 120 and is also connected to the positive voltage rail of the input via the resistor 111. The collector of transistor 101 is coupled to the positive voltage rail of the input via the inductor 130. The base of transistor 101 is connected to the collector of the first transistor 100, whose collector is also connected to the positive voltage rail of the input via the first resistor 110. The emitters of transistors 100, 101 are coupled to ground. An optional diode may be added in series with the base of the transistor 100 to prevent benign zener breakdown in its base-emitter junction and to provide better control when higher output voltages are needed.

The astable multivibrator creates a large negative slope in the current passing through the inductor 130 which establishes a voltage across the inductor determined by the following equation.

$$e_L = -L \frac{di}{dt} \qquad \text{EQUATION 2}$$

Preferably, inductor 130 is of the ferrite core type (either leaded or surface mount). The boosted output voltage pulses from the astable multivibrator circuit are rectified by diode 140, and filtered by reservoir capacitor 121 and clamped by zener diode 160, coupled in parallel to the rectified output from the astable multivibrator. The anode of diode 140 is connected to the input positive rail via inductor 130. The embodiment uses diode 140 to block negative voltage from the output. Zener diode 160 coupled across the output of the boosted, rectified voltage from the astable multivibrator prevents excessive voltages from developing in the circuitry, either within the astable multivibrator itself or across the circuit following the astable multivibrator and it can provide some degree of voltage regulation. Capacitor 121 acts as a reservoir or filter capacitor to establish a steady d.c. level from the unidirectional output pulses from diode 140. This voltage boost circuit is capable of operation at approximately three-quarters of one volt, and can be set by the voltage value (or omission) of zener diode 160 to provide quite high output voltage—in excess of 140 volts with no zener (low-resistance) and a 100 $\mu$H inductor.

The physical size of the inductor and other components is extremely small, particularly using surface mount components, e.g. an SOT-23 dual transistor, and the circuitry is economical. With appropriate control of component values, zener diode 160 can be omitted from the circuit, saving component and assembly costs. With the zener diode removed, rather high voltage (approximately 100 volts, or more, with other inductance/DCR values) is available for electro-optic systems requiring such. Due to the low current drain and the capacitive nature of the CMOS integrated circuit and its load as well as sundry stray capacitance in the circuit due to leads or circuit board traces, etc., filter capacitor 121 can be removed without causing operation to cease.

The voltage output by the voltage boost circuit is input to an integrated circuit 170, which contains a square wave generator and a frequency divider to create an optimized a.c. voltage for the electro-optic window. The timing of the square wave generator is controlled by capacitor 180 and resistor 190, coupled to pins 1, 2 and 3 of integrated circuit 170. The integrated circuit halves the frequency of the input voltage at pin 14 and outputs a symmetrical square wave that appears at pins 10 and 11.

Figure 9:
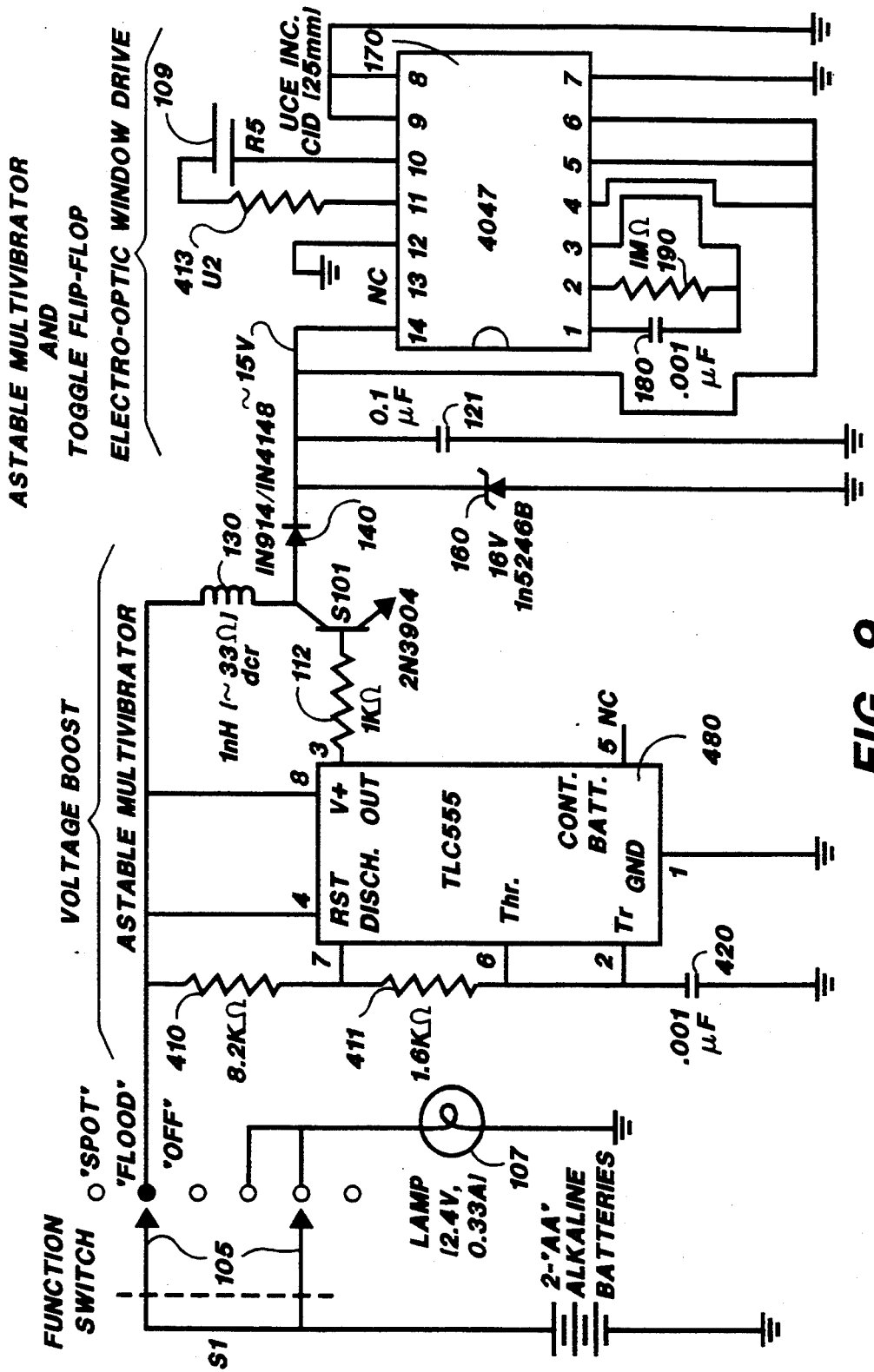
FIGS. 9–12 illustrate the addition to FIG. 7 of other embodiments of the voltage boost circuit.

FIG. 9 illustrates another embodiment of the voltage boost circuit using a CMOS integrated circuit 480 (e.g., TLC555) which can operate down to two volts. This embodiment has pins 4 and 8 coupled to the input supply voltage rail. Pin 7 is coupled to the supply voltage rail via resistor 410, and is coupled to ground via resistor 411 and capacitor 420. Pins 2 and 6 are coupled to ground via a capacitor 420. Pin 1 is coupled to ground. Pin 3 is coupled via resistor 112 to the base of transistor 101, whose emitter is coupled to ground. The collector of this transistor 101 is coupled to the input supply voltage rail via inductor 130. As before, transistor 101 creates the large negative slope in the current passing through inductor 130 to generate the required high voltage. Diode 140, zener diode 160 and capacitor 121 are connected as in FIG. 8 and perform identically. This embodiment shows optional resistor 413 coupled in series with the electro-optic window 109 to reduce charging current spikes to the electro-optic window 109 thus reducing current drain from the boosted rail, a technique appropriate for all embodiments using square-wave drive. As in FIG. 8, the integrated circuit 170 creates the necessary square wave from the boosted voltage at pin 14.

Figure 10:
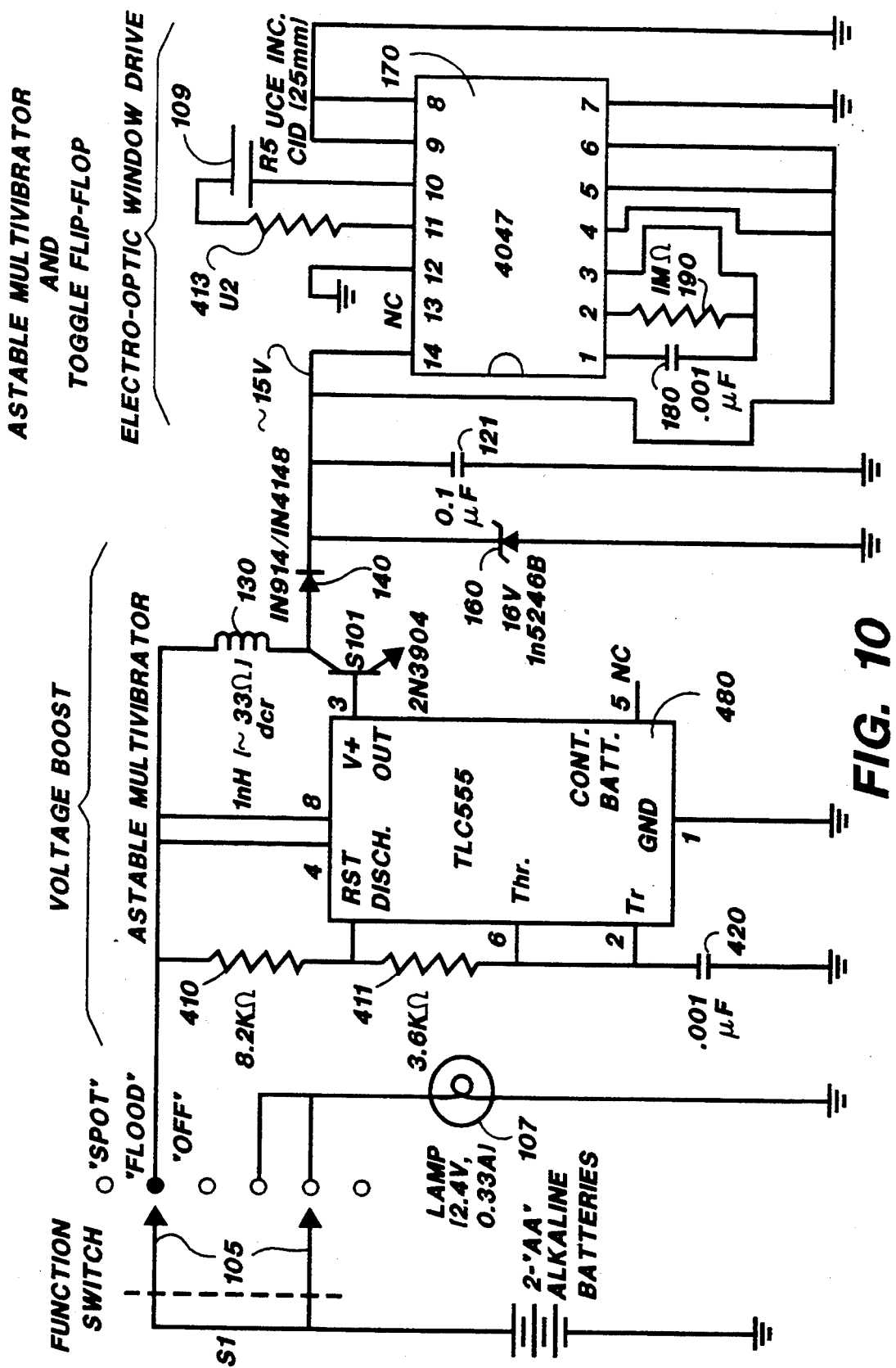

FIG. 10 illustrates an advantageous embodiment of the voltage boost circuit by using the internal resistance of the CMOS integrated circuit to perform the function of resistor 112 in FIG. 9. This embodiment reduces cost and space of the circuit.

Figure 11:
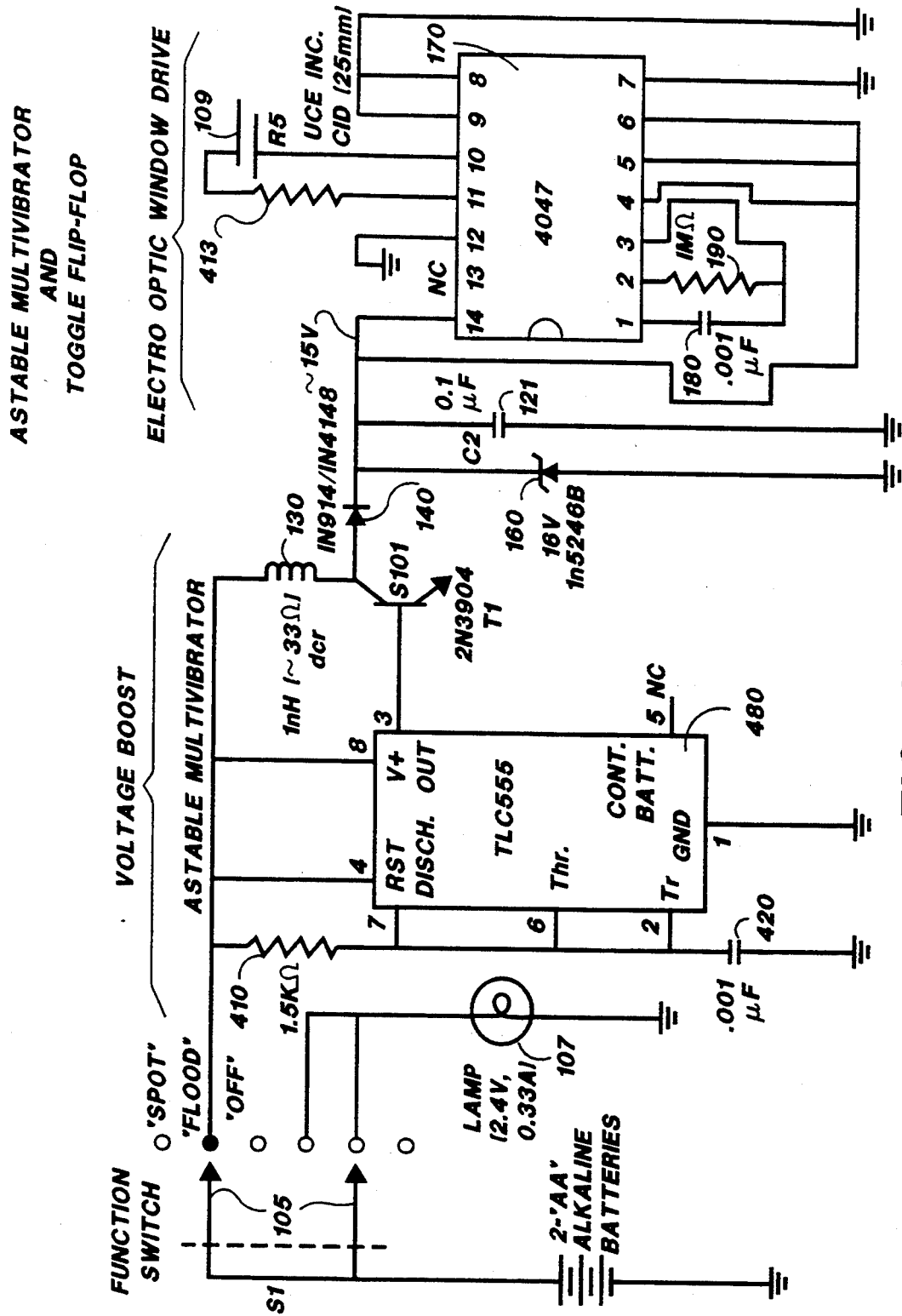

FIG. 11 illustrates another embodiment of the voltage boost circuit. By removing resistor 411 at pin 6 of FIG. 10. This embodiment results in approximately a 50% duty cycle in the voltage boost waveform and saves space. This embodiment uses a TLC551 as the CMOS integrated circuit 480, which operates down to one volt. The TLC551 may, be used in place of the TLC555 elsewhere in the circuit.

Figure 12:
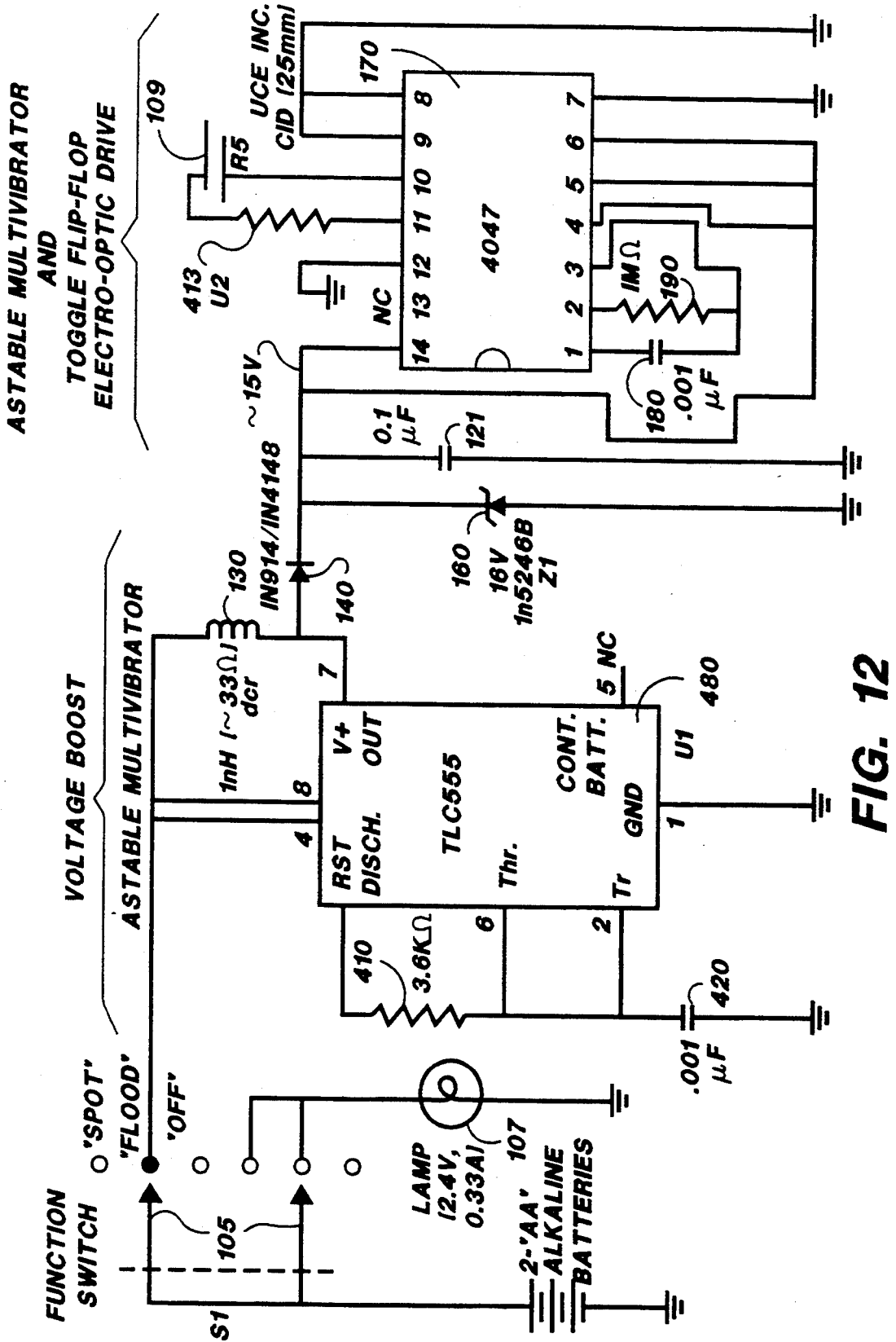

FIG. 12 illustrates another embodiment of the voltage boost circuit. In this embodiment, pins 3 and 7 have been reversed from their conventional application to allow the removal of the bipolar transistor 101, whose base is connected at pin 3 of FIG. 11. This is made possible by using the internal open drain configuration field effect transistor (FET), which is then available at pin 7, for switching the inductor lower terminal between ground and an open or floating state. An optional resistor between a lower middle switch position and the lamp allows for spot beam color temperature correction in some applications.

Figure 13:
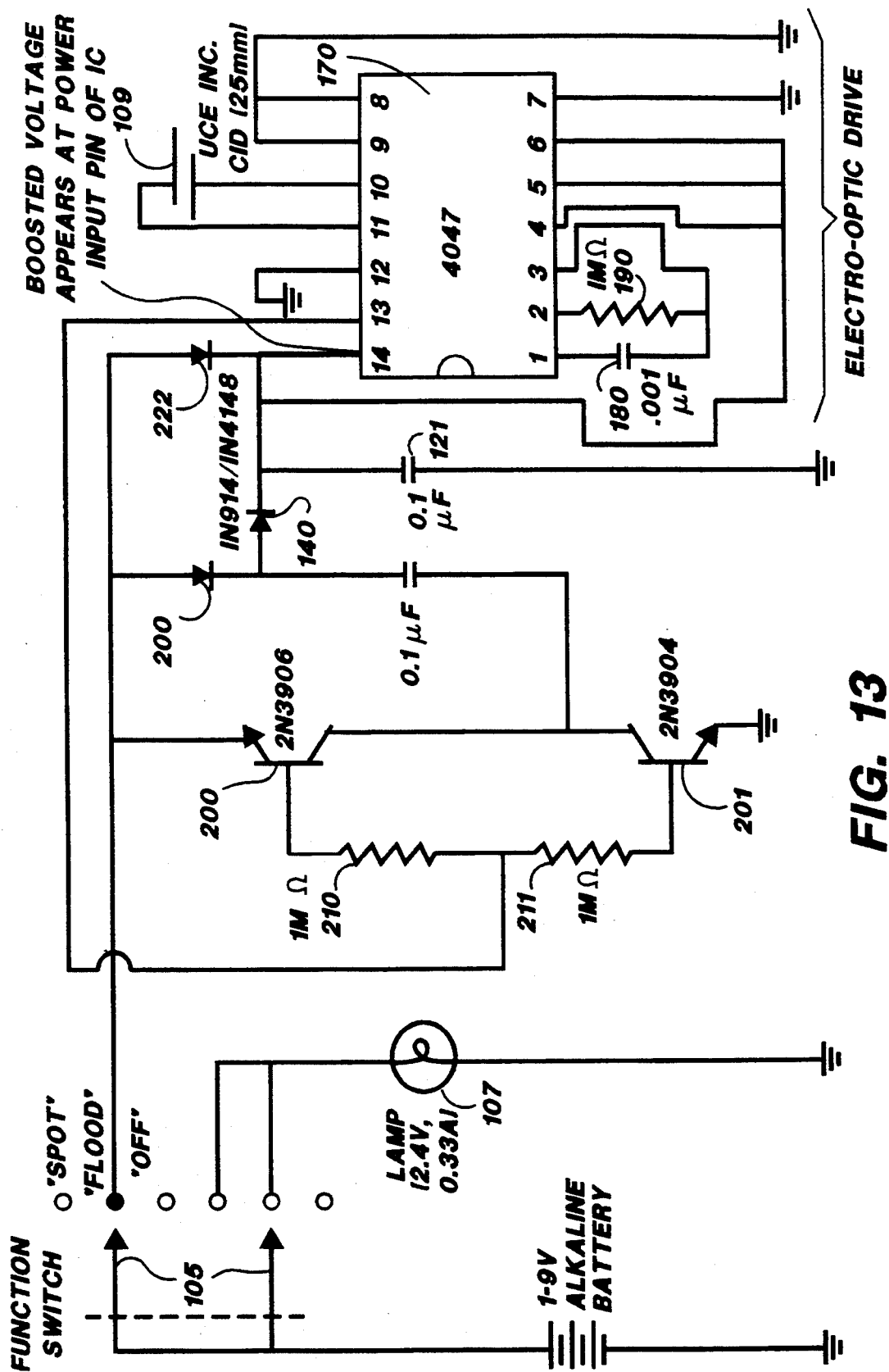
FIG. 13 shows FIG. 7 with a self-voltage-boost circuit.

FIG. 13 illustrates another embodiment of the voltage boost circuitry. The so called a self-voltage-boost circuit uses part of the integrated circuit 170 itself to create the required high voltage from the initial low voltage supply. This embodiment uses two complementary (pnp and npn) bipolar transistors 200, 201, two resistors 210 and 211, three diodes 220, 221 and 222 and two capacitors 230 and 121. Transistor 201 has its emitter coupled to ground, its base coupled to pin 13 of integrated circuit 170 via resistor 211, and its collector coupled to the collector of transistor 200. Transistor 200 has its emitter coupled to the voltage supply rail, and its base coupled to pin 13 of integrated circuit 170 via resistor 210. The collectors of transistors 200 and 201 are coupled via capacitor 230 and diode 220 to the voltage supply rail. The anode of diode 220 is coupled to the voltage supply rail, and the cathode of diode 220 is coupled to an anode of diode 221, whose cathode is coupled to pin 14 of integrated circuit 170. Another capacitor 121 is coupled from pin 14 to ground. The supply voltage rail is coupled to pin 14 of the integrated circuit 170 via diode 222.

A portion of the self-voltage-boost circuit of FIG. 13 operates as a charge pump circuit. At the point where the two collector are tied, diode 220 charges capacitor 230 ("the flying capacitor") if the voltage is low. When the voltage switches high at this point, the flying capacitor's voltage and the input rail are in series and the approximately doubled voltage dumps charge into the capacitor 121 ("as the reservoir capacitor"), creating approximately a doubling of the supply voltage. The reservoir or filter capacitor 121 then supplies roughly double the input rail voltage to pin 14 through an OR gate comprised of the diode 222—a second diode at this point is unnecessary because diode 221 acts as the second diode for purposes of the OR gate. The voltage on pin 14 is now approximately twice the supply voltage. In this embodiment, integrated circuit 170 operates as did integrated circuit 170 of FIG. 8 for the purposes of supplying a.c. to electro-optic plate 109, in addition to providing the driving signal to the charge pump via buffer transistors 200 and 201. Thus the integrated circuit 170 starts itself at the (low) input rail and then operates at the boosted (doubled) voltage.

Figure 14:
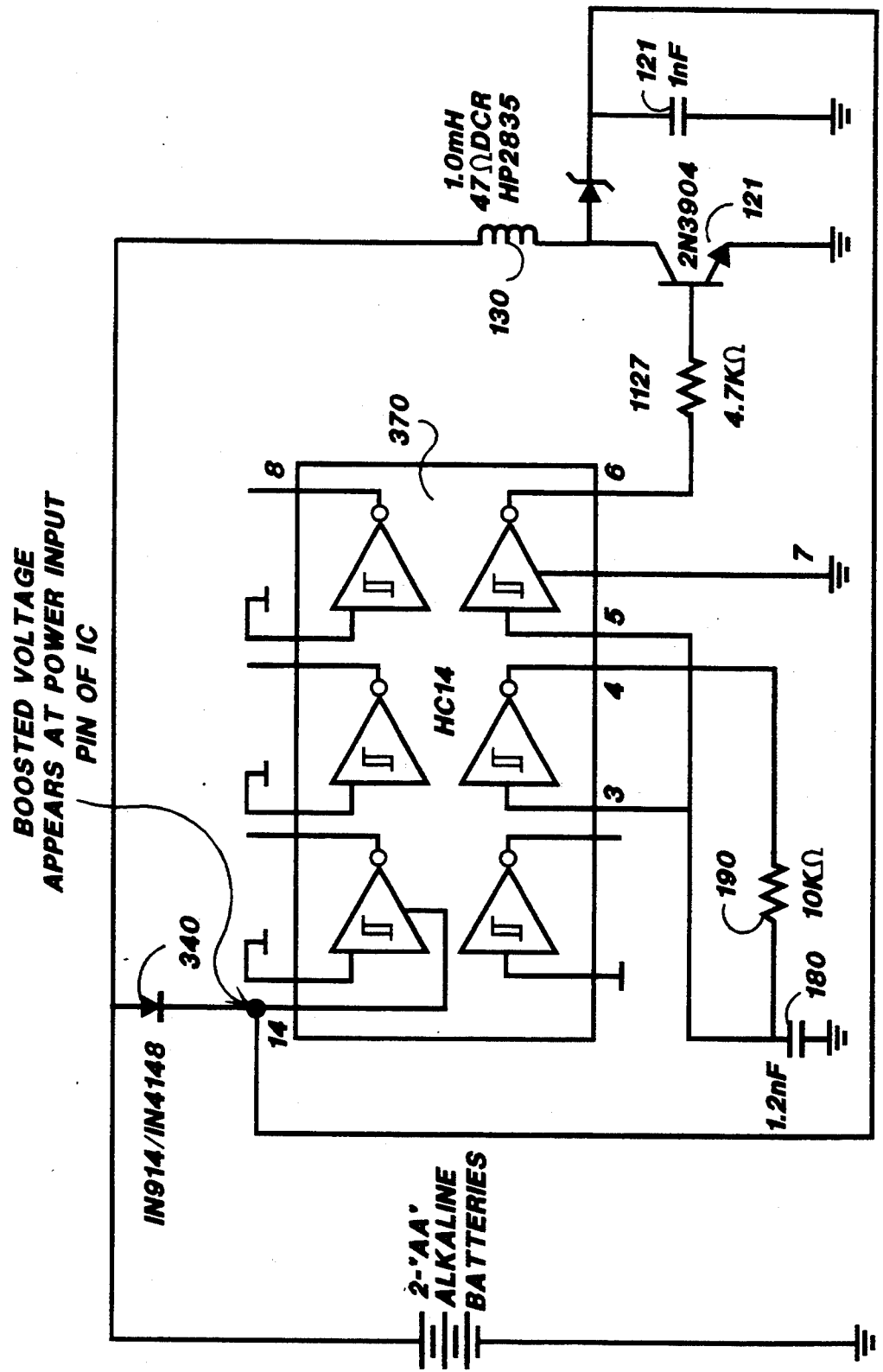
FIG. 14 illustrates another embodiment of the self-voltage-boost circuit.

FIG. 14 illustrates another embodiment of the self-voltage-boost circuit which shows the necessary components of the integrated circuit to perform the self-voltage-boost function. As an example, integrated circuit 370 has been shown having six gates. Two of the six gates are shown operating the voltage boost circuit, i.e., pins 3, 4, 5 and 6, which have capacitor 180 and resistor 190 coupled to them to set the timing of the square wave. In some cases, buffer gate at pins 5 and 6 will not be required. The remaining gates are available for general use, e.g., a.c generation for an electro-optic window. The circuit operates similarly to the voltage boost circuit of FIG. 8, where the large negative slope in current is created by transistor 101 through inductor 130. The positive voltage pulses are passed by diode 141 and filtered by capacitor 121 to pin 14, which now has the necessary high voltage.

Figure 15:
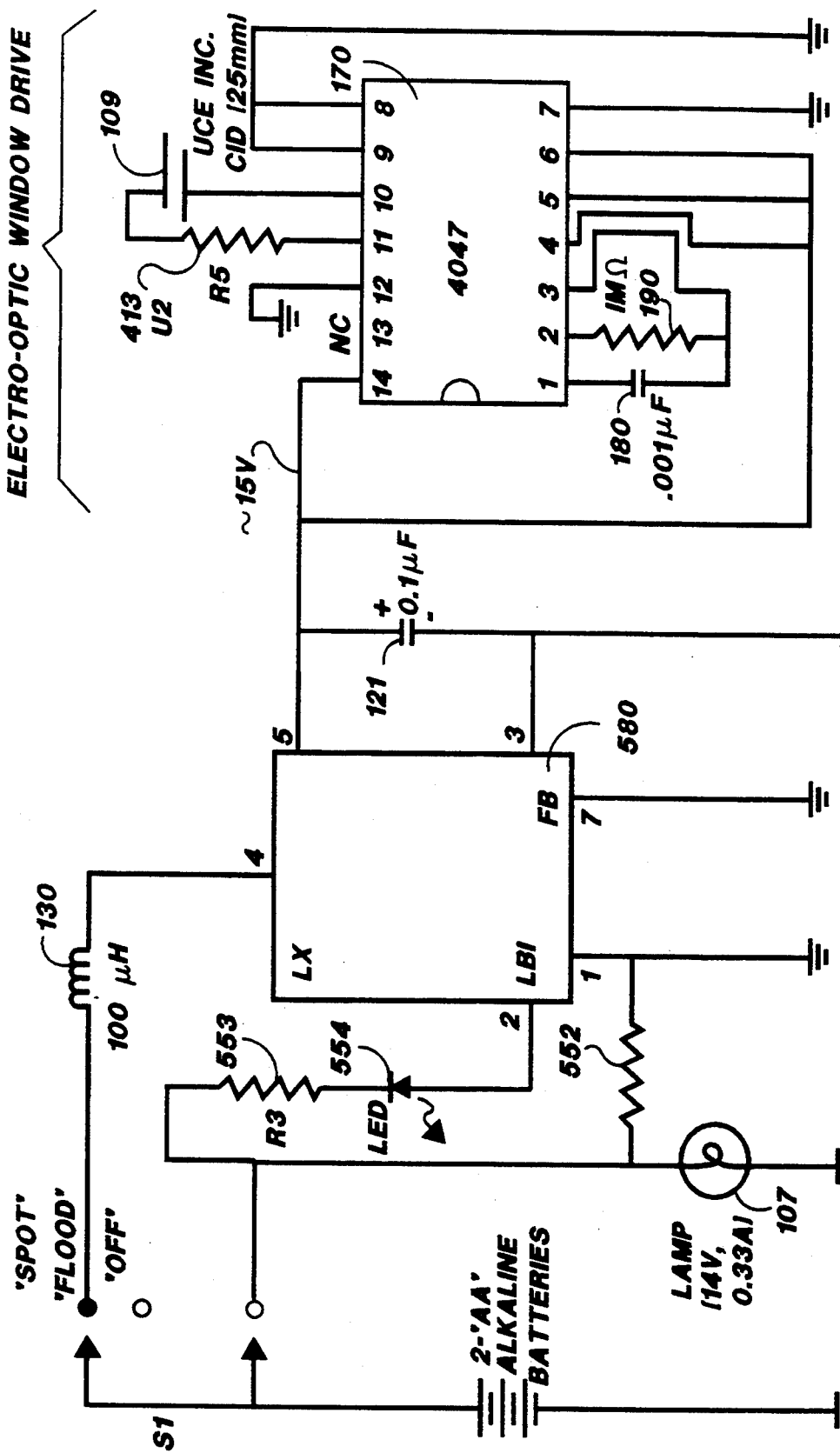
FIG. 15 shows FIG. 7 with a commercial voltage boost circuit with a low voltage indicator for the battery.

FIG. 15 illustrates an embodiment using a commercial voltage boost circuit with a low voltage indicator for the battery. This embodiment has an integrated circuit 580 with pin 4 connected to the supply voltage rail via an inductor 130. Pins 3 and 7 are tied to ground, and pin 3 is connected to pin 5 via a capacitor 550. Pin 1 is coupled to ground via resistor 551, and is coupled to the lamp 107 via resistor 552. Pin 2 is coupled to the second position of the lower half of switch 105 via resistor 553 and LED 554, which lights to indicate when the battery voltage is low. As before, the boosted voltage appears at pin 14 of integrated circuit 170.

Figure 16:
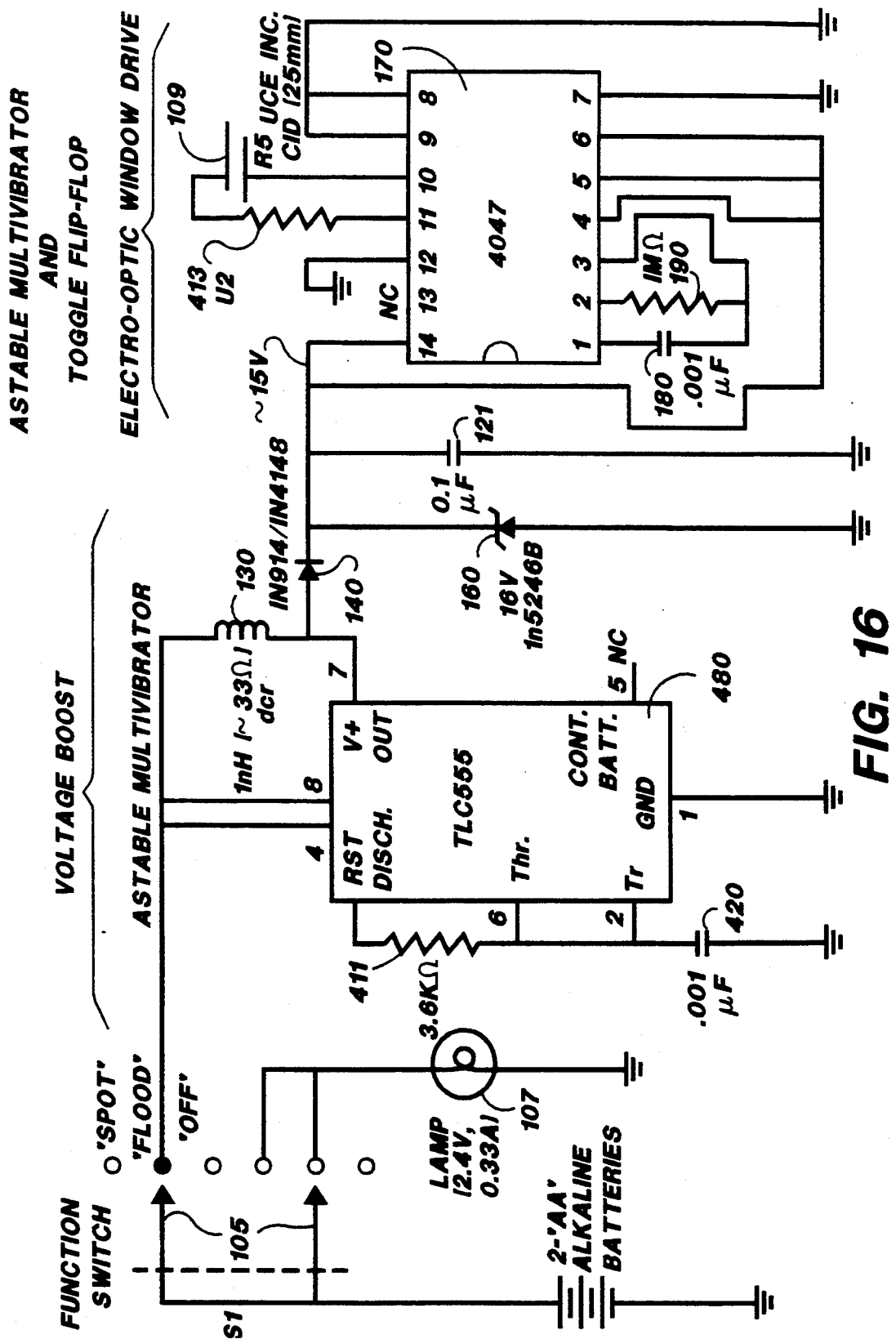
FIG. 16 shows a modification of the circuit of FIG. 12.

FIG. 16 illustrates another embodiment of the voltage boost circuit. As in FIG. 12, pins 3 and 7 have been reversed from their conventional application to allow the removal of bipolar transistor 101, whose base is connected at pin 3 of FIG. 11. Resistor 333 is shown in this circuit provides for filament temperature compensation, i.e., a relatively higher filament color temperature for the flood function with respect to the spot. The whiter light in the flood light function appears to be desirable to many users of such a light format. Resistor 333 providing filament temperature compensation can be connected to the "SPOT" position, allowing a lower voltage lamp to be used which provides a brighter flood beam. With this configuration, the "FLOOD" and "SPOT" positions can be switched, with little topological changes. In FIG. 16, blocking diode 820 has been inserted between the "FLOOD" setting and the lamp 107. This circuit allows an SP3T switch to be used rather than the more expensive DP3T switch. Resistor 333 could include a thermistor to regulate the beam, and/or to provide a soft start for the lamp.

Another embodiment of the circuits of FIGS. 7-16 uses a custom integrated circuit for all the components with possible exception of some passive boost component, such as an inductor. This embodiment has the advantages of small size, and low cost for high volume commercial applications.

An advantageous approach when using a custom integrated circuit would be the mounting technique described in Liquid Crystal Displays, Birendra Bahadur, Mol. Cryst. and Liq. Cryst., Vol. 109 No. 1 (1984), p. 34, in which the integrated circuit die is directly mounted on glass, or other material. This mounting technique has the advantage of using the glass or plastic from the electro-optic window as the substrate, thereby reducing the size of the flashlight by removing the space required for mounting of the IC.

Figure 17A:
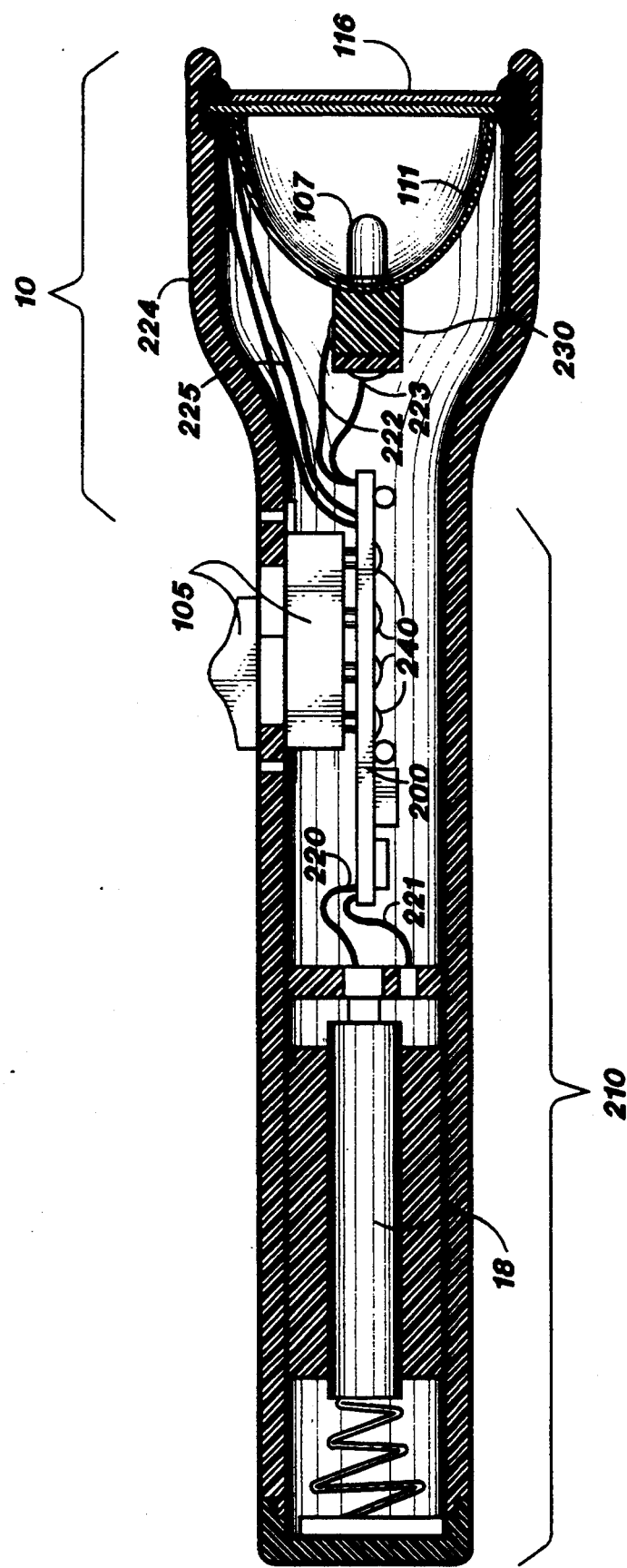
FIG. 17A shows a cross-sectional view of a flashlight constructed according to an embodiment of the invention.
Figure 17B:
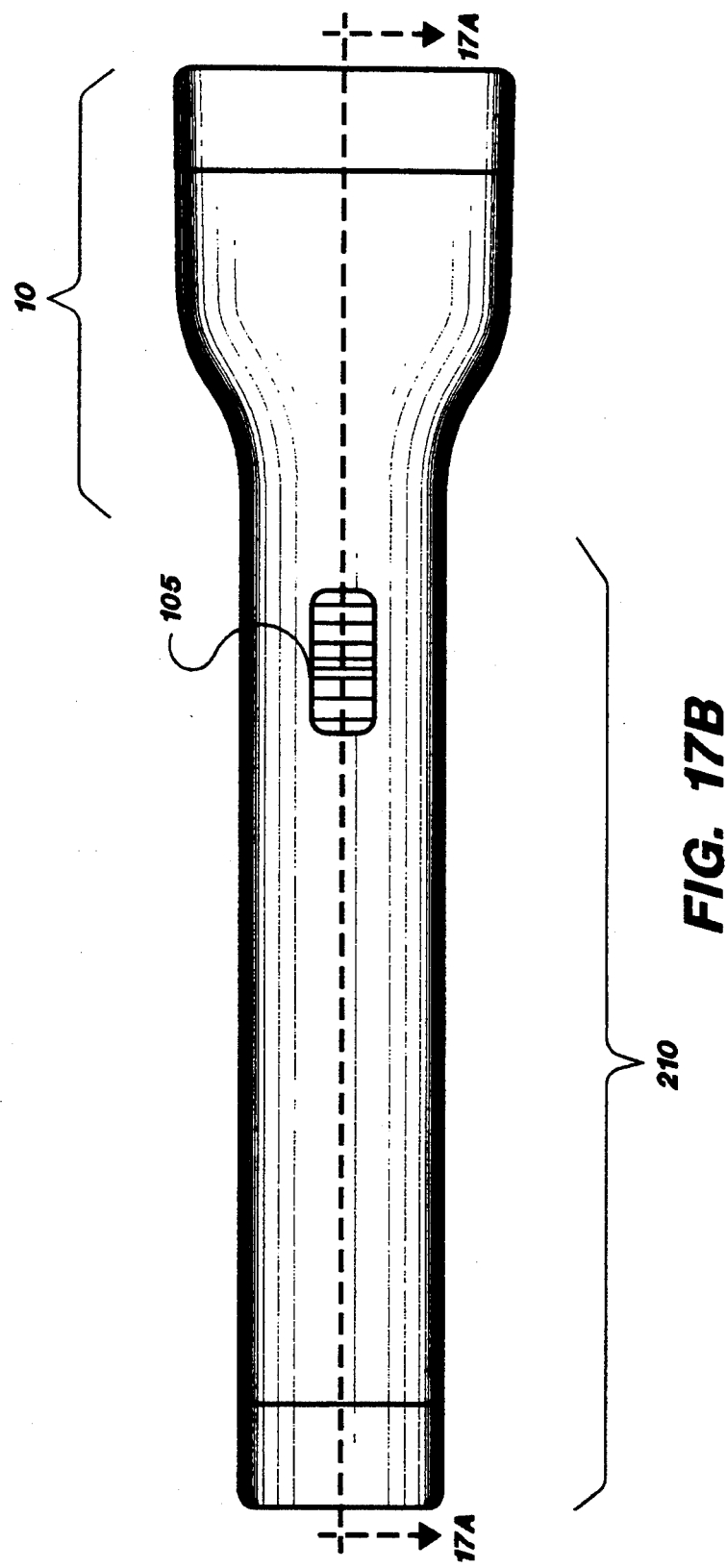
FIG. 17B shows a plan view of the flashlight of FIG. 17A.

FIG. 17A shows another embodiment of the present invention in which the electro-optic region is integral to the flashlight. As in FIGS. 2A and 2B, dc voltage source 18 e.g., two conventional AA alkaline batteries, provides a dc input voltage, typically about 3 volts, to printed circuit board 200. Printed circuit board 200 is attached to a dual-function three position switch 105, which selectively provides dc power to lamp 107, and selectively switches electro-optic region 16 between a first state and a second state.

Printed circuit board 200 contains the circuitry required to generate an output ac signal from the dc input voltage, where the ac output signal can be provided across electro-optic region 16 via wires 224 and 225. Printed circuit board 200 may further provide for increasing the input dc voltage provided by dc voltage source. While the input dc voltage is typically may be about 3 volts, the output dc voltage provided by the printed circuit board may be about 15 volts.

Figure 17C:
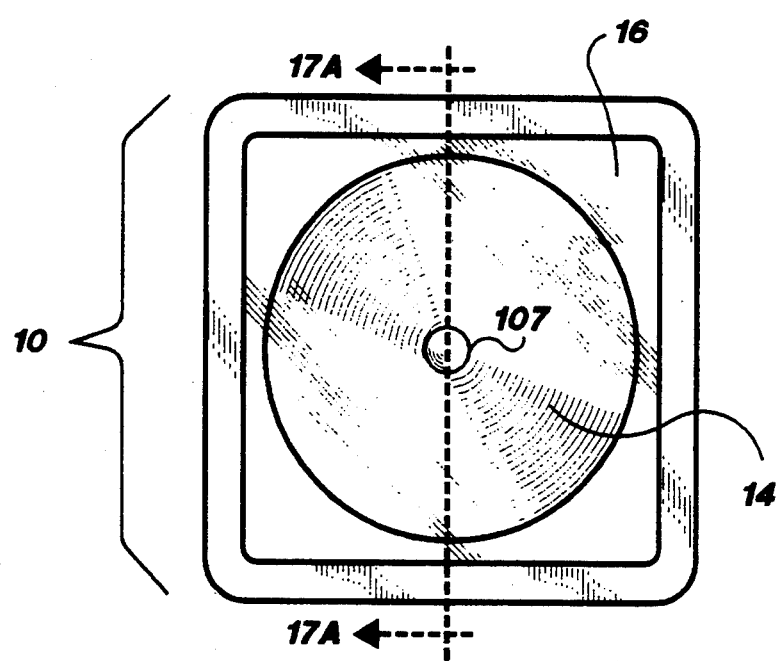
FIG. 17C shows a front end view of the flashlight of FIG. 17A.

Lamp housing 10 contains electro-optic region 16, lamp 107, and reflector 14. Flashlight housing 210 contains dc voltage source 18, switch 105, and printed circuit board 200. Wires 220 and 221 connect dc voltage source 18 to printed circuit board 200. Wires 222 and 223 connect printed circuit board 200 to lamp receptacle 230. As shown in FIG. 17C, the front end view of the flashlight of FIG. 17A, it is preferrable for the lamp 107 to be centrally disposed in reflector 14.

Dual-function three position switch 105 is connected to printed circuit board 200 by means of connecting pins 240. In its "off" position, switch 105 is in a first position. When switch 105 is in its second, "spot beam," position it provides dc power from dc voltage source 18 to lamp 107 via wires 222 and 223, but does not provide an ac signal across electro-optic region 16. Consequently, when switch 105 is in its second position, the electro-optic region is in a first state, where it is substantially transparent to light from the lamp 107 which has been collimated by reflector 14. In its third, "flood beam" position, switch 105 provides dc power to lamp 107 and further provides for the ac signal across electro-optic region 16 via the printed circuit 200 and wires 224 and 225. The ac signal causes the electro-optic region 12 to be in a second state where it substantially forward scatters the light from lamp 107 which has been collimated by reflector 14.

Figure 18A:
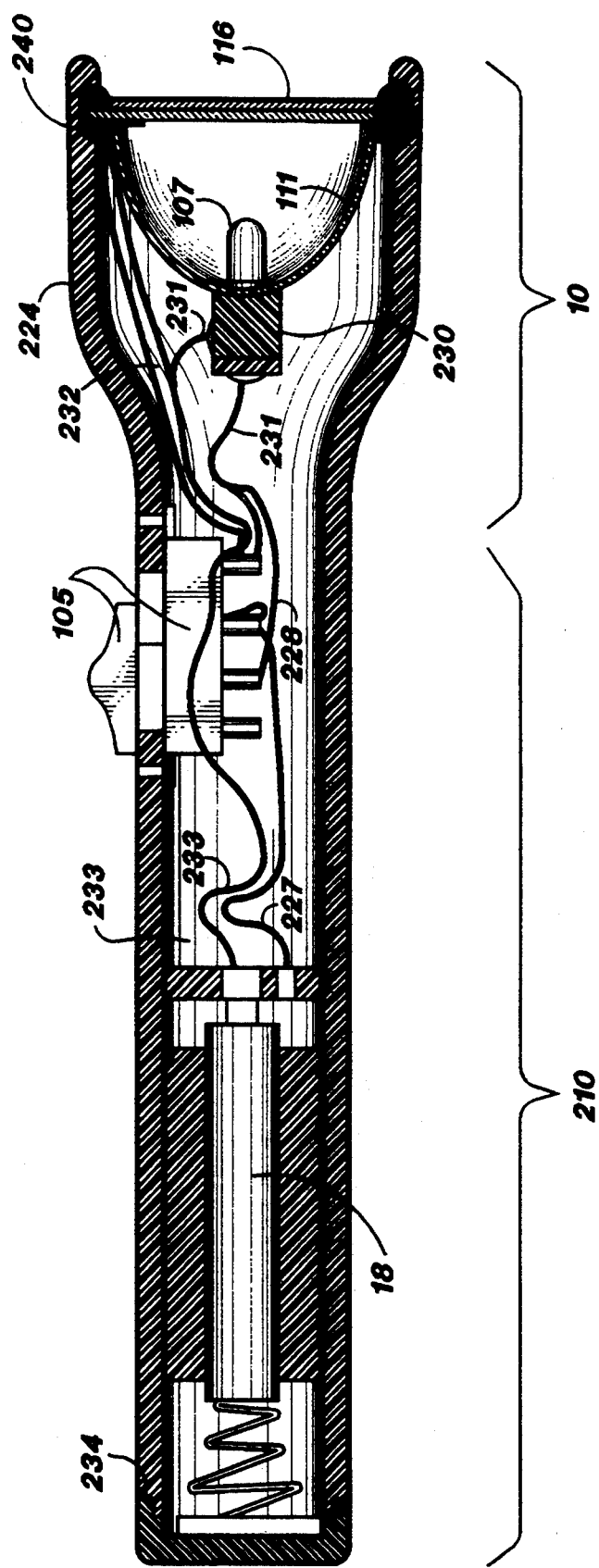
FIG. 18A shows a cross-sectional view of a flashlight constructed according to another embodiment of the invention.

FIG. 18A shows a cross-sectional view of another flashlight of the present invention. The flashlight of FIG. 18A, while it does not have the printed circuit board 200 shown in FIG. 17A, contains an integrated circuit 240 disposed on the rearward side of electro-optic region 16. In FIG. 18A, integrated circuit 240, covered by a small amount of epoxy glue, is disposed on one side of one of the electro-optic region 240 which consists of two glass plates having electro-optic material contained therebetween. The integrated circuit 240, which provides an ac output signal across electro-optic region 16, is driven by dc power from dc power source 18 via wires 229 and 232. Thus, the integrated circuit 240 performs essentially the same function as the printed circuit board 200 shown in FIG. 17A, i.e., it generates the ac output signal that allows electro-optic region 16 to be transformed into a second state.

Switch 105 provides power to lamp 107 and integrated circuit 240. Integrated circuit 240 and lamp 107 are grounded by wires 231 and 232, which join to form wire 233, which in turn is connected in to the negative electrode of dc power source 18 by conductor 234.

The operation of the flashlights of FIGS. 17A and 18A are similar. In the first "off" position, switch 105 of the flashlight of FIG. 18A does not supply current to lamp 107, or to integrated circuit 240. In the second "spot beam" position, switch 105 provides dc power to lamp 107 through wires 228 and 231, but does not provide dc power to the integrated circuit 240. When switch 105 is in its second position, therefore, electro-optic region 16 is in its first, quiescent state, where it is substantially transparent to the light from the lamp 107 which has been collimated by reflector 14. In the third, "flood beam" position, switch 105 supplies dc power to lamp 107 and to integrated circuit 240 through wires 229 and 232. Integrated circuit 240 then provides the ac output signal across electro-optic region 16, causing electro-optic region 16 to change to its second state where it substantially forward scatters the light from lamp 107, which has been collimated by reflector 14 to form a flood beam.

Figure 18B:
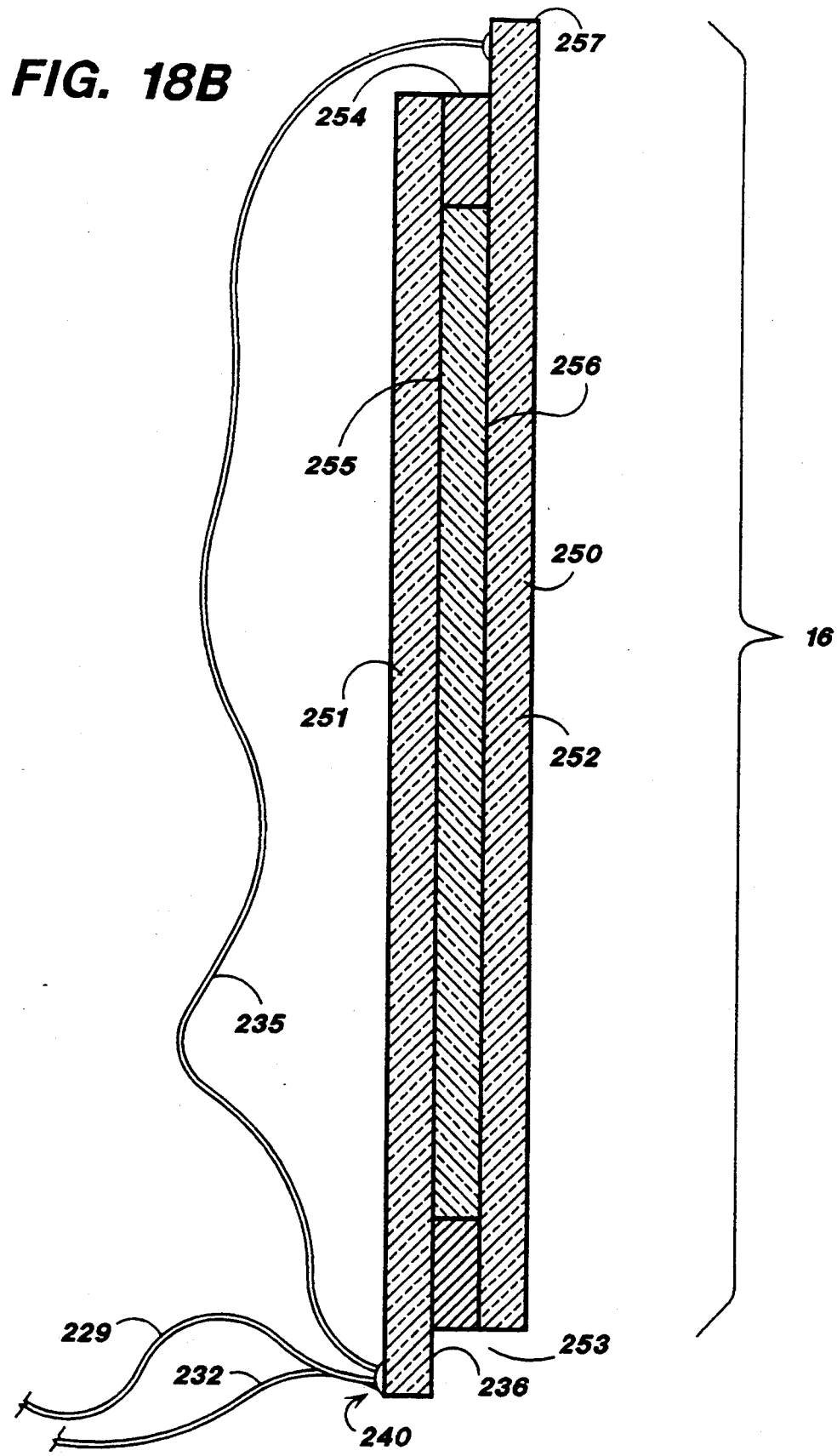
FIG. 18B shows a cross-sectional view of the electro-optic region of the flashlight of FIG. 18B.

FIG. 18B shows an enlarged view of the electro-optic region 16 shown in FIG. 18A. Positive dc power lead 232 and negative power lead 229 supply dc power to integrated circuit 240, positioned on the substrate provided by electro-optic plate 251 and below a small amount of epoxy glue. Thus, integrated circuit 240 is attached directly onto the outer surface of electro-optic plate 251 in a manner similar to the mounting technique described by Bierendra Bahadur, supra, in which an integrated circuit die is directly mounted on a glass surface. Integrated circuit 240 is, therefore, not visible beneath the epoxy glue.

Electro-optic plates 251 and 250 may be comprised of glass, or any other suitable transparent, essentially non-conductive, material. Disposed between the inner surfaces of electro-optic plates 250 and 251 is an electro-optic material 252, such as a liquid crystal nematic, cholesteric, or smectic material, which, when energized, can forward scatter light. The inner surfaces of electro-optic plates 250 and 251 are coated with conductive layers 255 and 256, respectively, comprised of a transparent conductive material such as indium tin oxide. Conductor 233 links one side of the ac output signal provided by integrated circuit 240 to conductive layer 255, while the other side of the ac signal output signal is provided to conductive layer 256 via wire 235 and connector 257. Insulator spacers 253 and 254 prevent shorting of the ac output signal across conductive layers 255 and 256. Thus an output ac signal provided by integrated circuit 240 is supplied across the substantially forward scattering material 252 disposed between the two electro-optic plates.

What is claimed:
1. A flashlight, comprising:
(a) a flashlight housing, the housing being suitable for at least one of receiving therein and mounting thereon at least one DC voltage source;
(b) a lamp housing connected to the flashlight housing, the lamp housing comprising a light source for emitting light and a reflector for collimating the emitted light forwardly therefrom along an optical axis;
(c) a first electrical circuit for selectively connecting the light source across the DC voltage source;
(d) an electro-optic region disposed forward of the light source along the optical axis and having two states, wherein in a first state light emitted from the light source and passing through the electro-optic region is formed into a spot beam, and in a second state light emitted from the light source and passing through the electro-optic region is formed into a flood beam, and
(e) a second electrical circuit for selectively providing at least one signal to the electro-optic region, the electro-optic region changing to one of the first state and the second state in response thereto,
wherein the flashlight is of such compact size and low weight as to be suitable for single-handed portable operation by a user, the flashlight further having the purpose of providing general purpose illumination.

2. The flashlight of claim 1, wherein the electro-optic region further has a third state in which light emitted from the light source and passing through the electro-optic region is formed into an intermediate beam having divergence characteristics between the spot beam formed when the electro-optic region is in the first state and the flood beam formed when the electro-optic region is in the second state.

3. The flashlight of claim 1, wherein the DC voltage source comprises at least one battery.

4. The flashlight of claim 3, wherein the at least one battery is a dry cell battery.

5. The flashlight of claim 1, wherein the DC voltage source comprises a plurality of batteries.

6. The flashlight of claim 1, wherein the first electrical circuit further comprises a first switch for selectively connecting the light source across the DC voltage source.

7. The flashlight of claim 1, wherein the second electrical circuit further comprises a second switch for selectively providing the at least one signal to the electro-optic region.

8. The flashlight of claim 1, wherein the second electrical circuit further comprises means for providing the at least one signal to the electro-optic region.

9. The flashlight of claim 1, wherein the second electrical circuit further comprises a first multivibrator for providing the at least one signal to the electro-optic region.

10. The flashlight of claim 9, wherein the first multivibrator is an astable multivibrator comprising an inductor, the at least one signal provided by the first multivibrator being a pulsed DC signal, the first multivibrator further comprising a first integrated circuit for controlling the frequency of the pulsed DC signal.

11. The flashlight of claim 10, wherein the second electrical circuit further comprises a second integrated circuit for controlling at least one of the frequency and amplitude of the ac signal.

12. The flashlight of claim 9, wherein the first multivibrator selectively converts the at least one signal from a pulsed DC signal to an ac signal.

13. The flashlight of claim 12, wherein the second electrical circuit further comprises at least a second multivibrator connected in series between the first multivibrator and the electro-optic region, the at least second multivibrator boosting the voltage of the at least one signal provided by the first multivibrator.

14. The flashlight of claim 1, wherein the first electrical circuit further comprises a first switch for selectively connecting the light source across the DC voltage source, and the second electrical circuit further comprises a second switch for selectively providing the at least one signal to the electro-optic region.

15. A flashlight, comprising:
(a) a flashlight housing, the housing being suitable for at least one of receiving therein and mounting thereon at least one DC voltage source;
(b) a lamp housing connected to the flashlight housing, the lamp housing comprising a light source for emitting light and a reflector for collimating the emitted light forwardly therefrom along an optical axis;
(c) a first electrical circuit comprising a first switch for selectively connecting the light source across the DC voltage source;
(d) an electro-optic region disposed forward of the light source along the optical axis and having two states, wherein in a first state light emitted from the light source and passing through the electro-optic region is formed into a spot beam, and in a second state light emitted from the light source and passing through the electro-optic region is formed into a flood beam;
(e) a second electrical circuit comprising a second switch for selectively providing at least one signal to the electro-optic region, the electro-optic region changing to one of the first state and the second state in response thereto, and
(f) a three-position switch electrically connected to the first switch and the second switch, the light source not being electrically connected across the DC voltage source when the three position switch is in a first position, the light source being electrically connected across the voltage source and the electro-optic region being in the first state when the three-position switch is in a second position, and the light source being electrically connected across the voltage source and the electro-optic region being in the second state when the three-position switch is in a third position,
wherein the flashlight is of such compact size and low weight as to be suitable for single-handed portable operation by a user, the flashlight further having the purpose of providing general purpose illumination.

16. The flashlight of claim 15, wherein the DC voltage source comprises at least one battery.

17. The flashlight of claim 15, wherein the second electrical circuit further comprises a first multivibrator for providing the at least one signal to the electro-optic region.

18. The flashlight of claim 17, wherein the first multivibrator is an astable multivibrator comprising an inductor, the at least one signal provided by the first multivibrator being a pulsed DC signal, the first multivibrator further comprising a first integrated circuit for controlling the frequency of the pulsed DC signal.

19. The flashlight of claim 18, wherein the second electrical circuit further comprises a second integrated circuit for controlling at least one of the frequency and amplitude of the ac signal.

20. The flashlight of claim 17, wherein the first multivibrator selectively converts the at least one signal from a pulsed DC signal to an ac signal.

21. The flashlight of claim 19, wherein the second electrical circuit further comprises at least a second multivibrator connected in series between the first multivibrator and the electro-optic region, the at least second multivibrator boosting the voltage of the at least one signal provided by the first multivibrator.

* * * * *